US006633652B1

(12) United States Patent
Donescu

(10) Patent No.: US 6,633,652 B1
(45) Date of Patent: Oct. 14, 2003

(54) METHOD OF INSERTING A WATERMARK AND AUTHENTICATING A DIGITAL SIGNAL

(75) Inventor: Ioana Donescu, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,750

(22) Filed: Nov. 30, 1999

(30) Foreign Application Priority Data

| Nov. 30, 1998 | (FR) | 98 15040 |
| Nov. 4, 1999 | (FR) | 99 13826 |

(51) Int. Cl.$^7$ .............................. G06K 9/00; H04L 9/00
(52) U.S. Cl. ........................ 382/100; 382/232; 380/51; 380/54; 713/176
(58) Field of Search ................. 382/100, 232; 380/51, 54; 713/176

(56) References Cited

U.S. PATENT DOCUMENTS

| 5,727,092 A | * | 3/1998 | Sandford et al. | 382/251 |
| 5,778,102 A | * | 7/1998 | Sandford et al. | 382/251 |
| 5,794,071 A | * | 8/1998 | Watanabe et al. | 710/27 |
| 5,809,139 A | * | 9/1998 | Girod et al. | 380/202 |
| 5,848,155 A | * | 12/1998 | Cox | 382/191 |
| 5,875,249 A | * | 2/1999 | Mintzer et al. | 380/54 |
| 5,915,027 A | * | 6/1999 | Cox et al. | 380/54 |
| 5,970,140 A | * | 10/1999 | Sandford et al. | 380/205 |
| 6,065,119 A | * | 5/2000 | Sandford et al. | 713/200 |
| 6,154,571 A | * | 11/2000 | Cox et al. | 382/250 |
| 6,330,672 B1 | * | 12/2001 | Shur | 713/176 |

OTHER PUBLICATIONS

"A Secure, Robust Watermark for Multimedia", I. J. Cox, et al., Information Hiding. International Workshop Proceedings, May 30, 1996, pp. 185–206, XP000646359.

"Watermarking Digital Images for Copyright Protection", J.J.K. O Ruanaidh, et al., IEE Proceedings: Vision, Image and Signal Processing, vol. 143, No. 4, Aug. 1, 1996, pp. 250–256, XP000613938.

"An Invisible Watermarking Technique for Image Verification", M. M. Yeung, et al., IEEE, Jul. 1997, pp. 680–683.

"Towards a Telltale Watermarking Technique for Tamper–Proofing", D. Kundur, et al., ICIP'98, Jan. 1998.

"Watermarking for Image Authentication", M. Wu, et al., ICIP'98, Jan. 1998.

"A Public Key Watermark for Image Verification and Authentication", P. Wah Wong, ICIP'98, Jan. 1998.

"A Secure, Robust Watermark for Multimedia", I.J. Cox, et al., Information Hiding, International Workshop Proceedings, May 30, 1996, pp. 185–206, XP000646359.

"Watermarking Digital Images for Copyright Protection", J.H.K. O Ruanaidh, et al., IEE Proceedings: Vision, Image and signal Processing, vol. 143, No. 4, Aug. 1, 1996, pp. 250–256, XP000613938.

* cited by examiner

*Primary Examiner*—Bhavesh M. Mehta
*Assistant Examiner*—Aaron Carter
(74) *Attorney, Agent, or Firm*—Fitzpatrick, Cella, Harper & Scinto

(57) ABSTRACT

A method of inserting an additional information item for authenticating a digital signal decomposed into a set of coefficients ($X_{ij}$), each coefficient being represented in 16 bits, and the additional information being represented by a set of binary values ($w_{ij}$) of the same size as the set of coefficients ($X_{ij}$), includes the steps of calculating (E5, E6), for at least one coefficient ($X_{ij}$), a check bit ($C_{ij}$) in accordance with a predetermined operation as a function of the first 15 bit planes of the coefficient ($X_{ij}$), of calculating (E7, E8) a last bit plane ($X^0_{ij}$) in accordance with a predetermined rule which is reversible as a function of the check bit ($C_{ij}$) and a binary value ($w_{ij}$) of the additional information item (W) and of substituting (E7) the last calculated bit plane ($X^0_{ij}$) for the last bit plane of the coefficient ($X_{ij}$).

49 Claims, 18 Drawing Sheets

METHOD OF INSERTING A WATERMARK AND AUTHENTICATING A DIGITAL SIGNAL

BACKGROUND OF THE INVENTION

1. Field of the Invention

The present invention concerns a method of inserting an additional information item such as a watermark in a digital signal.

It also concerns a method of authenticating a digital signal from a watermark inserted in the signal.

Correlatively, the present invention concerns a device for inserting an additional information item and a device for authenticating a digital signal adapted respectively to implement the insertion and authentication methods according to the invention.

2. Description of Related Art

The present invention concerns in general terms the authentication of digital data, and more particularly digital images. Its purpose is to allow the detection of changes occurring in original digital data.

More precisely, the authentication method according to the invention comes within the technical field of watermarking of digital data which can be interpreted as the insertion of a seal in the digital data, enabling the content of an original digital data file to be authenticated.

In a conventional fashion, and as described for example in the European patent application EP 0 766 468 filed in the name of NEC CORPORATION, watermarking techniques can be used for protecting copyright over a digital document. In such a case, the watermark inserted must, amongst other things, be robust to the different manipulations performed on the digital data, and notably the conventional techniques of digital data compression.

Unlike the digital data watermarking techniques aimed at protecting the author of a digital document, watermarking techniques for authenticating the data themselves must make it possible to detect any change to or manipulation of the digital data. The watermark inserted for authenticating original digital data must consequently not be robust to the various conventional manipulations of the image.

In addition to its fragility with regard to the changes undergone by the document, this inserted watermark must be imperceptible, for the purpose of preserving the quality of the digital document, and notably the visual quality when the document to be authenticated is a digital image, and be difficult to counterfeit in order to prevent a counterfeiter from reinserting the same watermark in digital data which have been modified.

Such a method of authenticating digital data by the insertion of a watermark in the data is described in the article entitled "Digital watermarking using multiresolution wavelet decomposition" by D KUNDUR and D HATZINAKOS, Proc. ICASSP, pages 2969–2972, May 1998.

This method thus makes it possible to insert an additional information item, which can for example contain information on the origin of the data or their date of creation, and to sign these original data.

However, in this article, the insertion and authentication method described requires the spectral wavelet decomposition of a digital image to be authenticated and then the reverse wavelet spectral recomposition of the digital image after insertion of the watermark.

In addition to the fact that this spectral decomposition is expensive in calculation time, the method described makes it possible to authenticate only an original digital image but does not make it possible to protect digital data already compressed by various coding methods.

BRIEF SUMMARY OF THE INVENTION

The aim of the present invention is notably to propose a method of inserting an additional information item with a view to the authentication of digital data which make it possible to detect digital data in various spectral or spatial representation fields.

It makes it possible notably to insert an additional information item in digital data which are compressed in order to be stored or transmitted, in a manner compatible with the compression used.

The insertion method is applied to a digital signal decomposed into a set of coefficients, each coefficient being represented in L bits, and makes it possible to insert an additional information item represented by a set of binary values with the same size as the set of coefficients representing the digital signal to be authenticated.

The method comprises calculating, for at least one coefficient, a check bit, and then substituting a coefficient watermarked as a function of the check bit and a binary value of the additional information item for the said at least one coefficient.

According to the invention, the insertion method is characterised in that it includes the following steps:

calculating, for at least one coefficient, a check bit in accordance with a predetermined operation as a function of L-M first bit planes of said coefficient;

calculating M last bit planes according to a predetermined rule which is reversible as a function of the check bit and a binary value of the additional information item; and substituting the M last bit planes calculated for the M last bit planes of said coefficient.

Thus the method of inserting a watermark according to the invention is applied to any digital signal provided that it is represented by a set of spatial or spectral coefficients.

The insertion method can thus be applied notably directly to a compressed representation of a digital signal.

The additional information is incorporated directly in the digital signal, by modifying only the last bit planes of the coefficients, that is to say the least significant bits LSB of the coefficients so that it remains imperceptible.

In addition, the check bit calculated from the coefficient itself depends only on the first bit planes, that is to say the most significant bit planes of the coefficient. These first L-M bit planes are not modified during the substitution step, which has the advantage, during the authentication of the digital signal, of being able to recalculate, for each coefficient, a check bit identical to that calculated at the time of insertion of the additional information and to facilitate the detection of any changes made to the original digital signal.

According to a symmetrical aspect of the invention, a method of authenticating a digital signal, from an additional information item, such as a watermark, inserted in the digital signal by the insertion method as described above, is characterised in that it includes the following steps:

calculating, for at least one coefficient, a check bit according to said predetermined operation as a function of L-M first bit planes of said coefficient;

extracting the value of the additional information item inserted in accordance with said predetermined rule which is reversible as a function of the check bit and the last M bit planes;

comparing the extracted value of the additional information item inserted and the binary value of the additional information item; and deciding whether or not to authenticate the digital signal depending on whether or not said extracted value and said binary value of the inserted additional information item are identical.

As described previously, the authentication method is all the more simple to implement since the check bit, calculated from unmodified bit planes of the coefficients, is identical to that calculated during the calculation step of the insertion method.

It is thus possible, at the extraction step, to use a deterministic rule which is simple to reverse in order to extract the binary value of the additional information item inserted.

In addition, according to the spectral or spatial representation of the digital signal by the coefficients, the authentication method makes it possible to locate, in the representation space, the changes made to the digital signal.

Moreover, as before, the authentication method makes it possible to authenticate a compressed representation of a digital signal and is therefore intrinsically robust with respect to the compression algorithm used.

According to a preferred characteristic of the invention, at the step of calculating a check bit of the insertion method and authentication method, said predetermined operation is a function of the L-M first bit planes and a confidential key represented in L bits.

Although optional, the use of a confidential key makes the insertion of the additional information item in the digital signal more certain and more difficult to counterfeit.

Advantageously, said predetermined operation consists of effecting a sum of binary operations on the first L-M bit planes of the said coefficient and the first L-M bit planes of the said confidential key and calculating the check bit as a function of the parity of the said sum.

The step of calculating a check bit is thus implemented simply and rapidly on the coefficients representing the digital signal.

According to a preferred characteristic of the invention, which makes it possible to make the inserted additional information item imperceptible as far as possible, the number M of substituted bit planes is equal to 1 or 2.

According to another preferred characteristic of the invention, at the step of calculating the last M bit planes of the insertion method, the value of the last bit plane is equal to the value of the check bit or to the alternative value of the check bit depending on the state of the binary value of the additional information item.

Correlatively, at the extraction step of the authentication method, the value of the additional information is equal to one state or another state depending on whether or not the value of the last bit plane is equal to the value of the check bit.

The calculation rule used at the time of insertion is particularly simple to implement using the value of the check bit and the value of the additional information item to be inserted.

It also has the advantage of being simple to reverse for authenticating the digital signal in order to find, from the value of the check bit and the value of the last bit plane, the binary value of the information which is assumed to have been inserted.

According to an advantageous characteristic of the insertion method, the number of substituted bit planes is equal to 2 and, at the step of calculating the last M bit planes, the value of the penultimate bit plane is equal to the alternative value of the last bit plane.

Correlatively, at the extraction step of the authentication method, the number of bit planes is equal to 2 and the value of the additional information item is extracted only if the value of the penultimate bit plane is equal to the alternative value of the last bit plane.

This characteristic is an advantage at the time of authentication of the digital signal since the probability of a modified coefficient nevertheless making it possible to extract a correct value of the inserted information is lower since the last two bit planes must have been modified whilst keeping alternate values.

According to a preferred embodiment of the invention, when the digital signal is decomposed into a set of quantized spectral coefficients, the insertion method also includes a prior step of choosing a subset of quantized spectral coefficients, in which the chosen coefficients have at least a magnitude strictly greater than zero, the steps of calculating a check bit, calculating the last M bit planes and substituting being implemented for each coefficient of said subset.

Restricting the coefficients able to be modified to a subset of non-nil coefficients avoids modifying the coefficients set to zero at the time of quantization of the digital signal. In this way the advantages of quantization of the digital signal in order to compress it are not lost.

Advantageously, the subset of coefficients includes the quantized spectral coefficients whose magnitude is greater than a threshold value.

The threshold value can thus be fixed so that the coefficients liable to be modified have a sufficiently high magnitude for the substitution of the last bit planes to be of little significance with respect to the value of the coefficient.

In this preferred embodiment of the invention, the set of binary values representing the additional information item is advantageously generated by the repetition of an initial binary information item with a size smaller than the size of the set of quantized spectral coefficients.

This provision makes it possible to increase the probability of all the initial binary information being inserted in the digital signal even if certain coefficients are not liable to be modified.

On the other hand, if the additional information item has an identical resolution to that of the digital signal to be authenticated, certain binary values are not inserted when they correspond to quantized spectral coefficients with a magnitude less than the predetermined threshold value.

Correlatively, the authentication method, in this preferred embodiment, also includes a prior step of choosing a subset of quantized spectral coefficients, in which the chosen coefficients have a magnitude greater than a threshold value, the steps of calculating a check bit, extracting, comparing and deciding being implemented for each coefficient of the said subset.

This characteristic makes it possible to implement the authentication method only on all the coefficients liable to have been modified during the insertion of the additional information item.

According to an advantageous characteristic of the invention, which affords a practical implementation of the present invention for authenticating a digital signal stored in a compressed file, the insertion method also includes a prior step of entropic decoding adapted to extract the quantized spectral coefficients and a step of entropic coding after said substitution step.

Likewise, the authentication method for authenticating a digital signal stored in a compressed file also includes a prior step of entropic decoding adapted to extract the quantized spectral coefficients.

Correlatively, the present invention also concerns a device for inserting an additional information item such as a watermark for authenticating a digital signal decomposed into a set of coefficients, each coefficient being represented in L bits, and said additional information item being represented by a set of binary values of the same size as said set of coefficients, characterised in that it has:

- means of calculating a check bit in accordance with a predetermined operation as a function of L-M first bit planes of a coefficient;
- means of calculating M last bit planes according to a predetermined rule which is reversible as a function of the check bit and a binary value of the additional information item; and
- means of substituting the last M bit planes calculated for the last M bit planes of said coefficient.

Likewise, the present invention concerns a device for authenticating a digital signal from an additional information item such as a watermark inserted in said digital signal by the insertion method according to the invention, said digital signal being decomposed into a set of coefficients, each coefficient being represented in L bits, characterised in that it has:

- means of calculating a check bit according to said predetermined operation as a function of L-M first bit planes of a coefficient;
- means of extracting the value of the additional information item inserted in accordance with said predetermined rule which is reversible as a function of the check bit and the last M bit planes of said coefficient;
- means of comparing the extracted value of the additional information item inserted and the binary value of the additional information item; and
- means of deciding whether or not to authenticate the digital signal according to whether or not said extracted value and said binary value of the inserted additional information item are identical.

These insertion and authentication devices have preferential characteristics and advantages similar to those described previously for the insertion method and the authentication method.

In one particular embodiment of the invention, the latter further permits authentication of a compressed signal, with a tolerance in relation to a slight over-compression of the signal. An signal over-compressed within an adjustable limit can be authenticated as being a correct signal.

For this purpose, the invention provides a method of inserting an additional information item such as a watermark for authenticating a digital signal comprising a set of coefficients, the said additional information item being represented by a set of binary values with a size smaller than that of the said set of coefficients, characterised in that it includes the steps of:

- determining a set of parameters representing the signal, with a size at least equal to that of the set of binary values
- quantizing the parameters representing the signal according to a predetermined quantization pitch;
- inserting the binary values in the quantized representative parameters;
- dequantizing the parameters previously processed;
- inserting the dequantized parameters in the signal.

Correlatively, the invention relates to a device for inserting an additional information item such as a watermark for authenticating a digital signal comprising a set of coefficients, the said additional information item being represented by a set of binary values with a size smaller than that of the said set of coefficients, characterised in that it includes:

- means of determining a set of parameters representing the signal, with a size at least equal to that of the set of binary values;
- means of quantizing the parameters representing the signal according to a predetermined quantization pitch;
- means of inserting the binary values in the quantized representative parameters;
- means of dequantizing the parameters previously processed;
- means of inserting the dequantized parameters in the signal.

Thanks to the above characteristics, a signal that may possibly have been over-compressed, within an adjustable limit, can be authenticated.

The choice of quantization pitch makes it possible to adjust the compromise between over-compression tolerance and the quality of the watermarked signal.

According to one preferred characteristic, the binary values are inserted in the quantized representative parameters according to the method initially presented, in which the set of coefficients in question is the set of quantized representative parameters.

According to preferred characteristics and alternatives, the set of the representative parameters comprises mean values of the coefficients calculated for blocks of coefficients of the signal, or the set of representative parameters comprises low-frequency coefficients of a frequency decomposition carried out in blocks.

The first case applies when the signal to be processed is represented in raw data, whereas the second applies to the case in which the signal is in a compressed form involving frequency decomposition.

The insertion device according to the invention comprises means for implementing the above characteristics.

The invention also relates to a method of authenticating a digital signal from an additional information item such as a watermark inserted in the said digital signal by the insertion method presented above, the said additional information item being represented by a set of binary values with a size smaller than that of the said set of coefficients, characterised in that it includes the steps of:

- determining a set of parameters representing the signal, with a size at least equal to that of the set of binary values;
- quantizing the parameters representing the signal according to a predetermined quantization pitch;
- extracting additional information values from the said quantized representative parameters;
- comparing the values extracted with the values of the additional information item;
- deciding whether or not to authenticate the digital signal as a function of the result of the comparison step.

Correlatively, the invention relates to a device for authenticating a digital signal from an additional information item such as a watermark inserted in the said digital signal by the insertion device presented above, the said additional information item being represented by a set of binary values with a size smaller than that of the said set of coefficients, characterised in that it includes:

- means of determining a set of parameters representing the signal, with a size at least equal to that of the set of binary values;

means of quantizing the parameters representing the signal according to a predetermined quantization pitch;

means of extracting additional information values from the said quantized representative parameters;

means of comparing the values extracted with the values of the additional information item;

means of deciding whether or not to authenticate the digital signal as a function of the result supplied by the comparing means.

The present invention also concerns a computer, a digital signal processing apparatus, a digital photographic apparatus or a digital camera having means adapted to implement the insertion method and/or means adapted to implement the authentication method.

It also concerns a computer, a digital signal processing apparatus, a digital photographic apparatus or a digital camera comprising an insertion device and/or an authentication device according to the invention.

The present invention also relates to an information storage means which can be read by a computer or by a microprocessor, integrated or not into an insertion or authentication device, possibly removable, which stores a program implementing the insertion or authentication method according to the invention.

The characteristics and advantages of this computer, digital signal processing apparatus, digital photographic apparatus, digital camera or storage means are identical to those disclosed above.

Other particularities and advantages of the invention will also emerge from the following description.

BRIEF DESCRIPTION OF THE DRAWINGS

In the accompanying drawings, given by way of non-limitative examples.

DETAILED DESCRIPTION OF THE INVENTION

Figure 1:
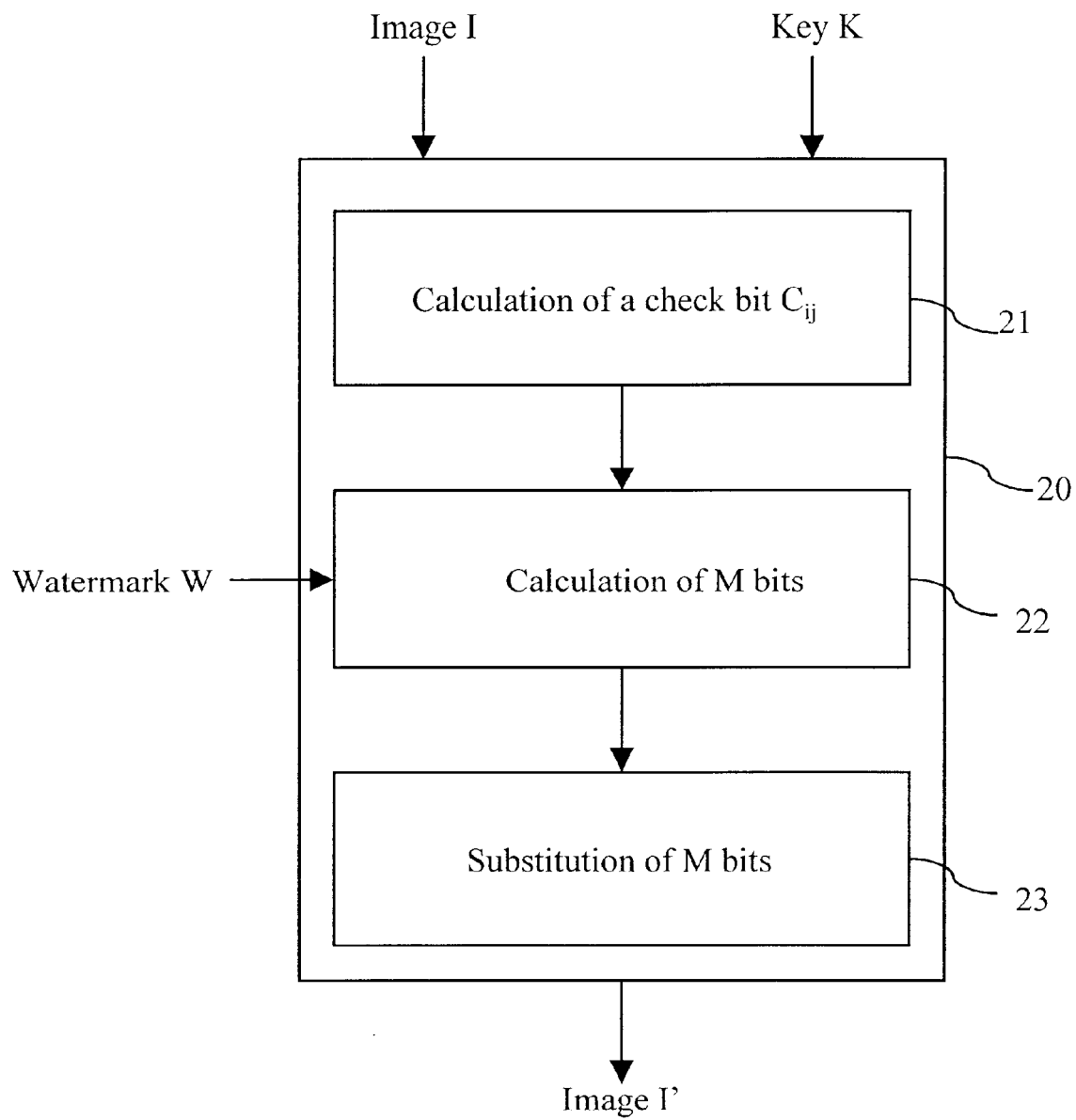
FIG. 1 is a block diagram illustrating an insertion device according to the invention.

A description will be given first of all of a device for inserting an additional information item in digital data with reference to FIG. 1.

In this example, and by way of non-limitative example, the digital signal is a digital image I consisting of a series of digital samples. An original image I can be represented by a series of pixels coded for example in 8 bits or byte. The black and white image I can thus be decomposed in the spatial domain into a set of coefficients in 256 grey levels, each coefficient value representing a pixel of the image I.

Conventionally, in the field of digital data processing, the image I can also be represented in a spectral domain, after spectral decomposition of the digital image, by a set of spectral coefficients, possibly quantized when the image I is to be stored or transmitted in a compressed data file. These spectral coefficients are also represented in a number L of bits, for example L=8 if the coefficient is represented in a byte.

In the remainder of the description relating to the insertion and authentication devices, the spatial or spectral coefficients are indifferently denoted $X_{ij}$, with i and j varying on the dimensions of the decomposed image in two perpendicular directions.

The additional information item to be inserted for authenticating the image I is a watermark W. This watermark can contain information on the origin of the digital data (identification of the author or owner of the image) or on their date of creation. It is also represented by a set of binary values $w_{ij}$, equal for example to 0 or 1, of the same size as the said coefficients $X_{ij}$.

In general terms, an insertion device is similar to a coder 20 which codes, in an image I, in a compressed or uncompressed format, a watermark W. A watermarked image I' is supplied at the output of the coder 20.

According to the invention, the insertion device has:

means 21 of calculating a check bit $C_{ij}$ according to an operation predetermined as a function of first L-M bit planes of a coefficient $X_{ij}$;

means 22 of calculating M last bit planes in accordance with a predetermined rule reversible as a function of the check bit $C_{ij}$ and a binary value $w_{ij}$ of the additional information item W; and means 23 of substituting the last M bit planes calculated for the last M bit planes of the coefficient $X_{ij}$.

In this way the M least significant bit planes of the coefficient $X_{ij}$ are modified as a function of the other L-M bit planes of the coefficient $X_{ij}$ and of the information item to be inserted $w_{ij}$.

Preferably, the number of modified bit planes is equal to 1 or 2 so as to limit the modification of the coefficients to the bit planes of very low significance and to guarantee imperceptibility of the watermark inserted in the image. In this way the visual quality of the document is preserved.

Figure 2:
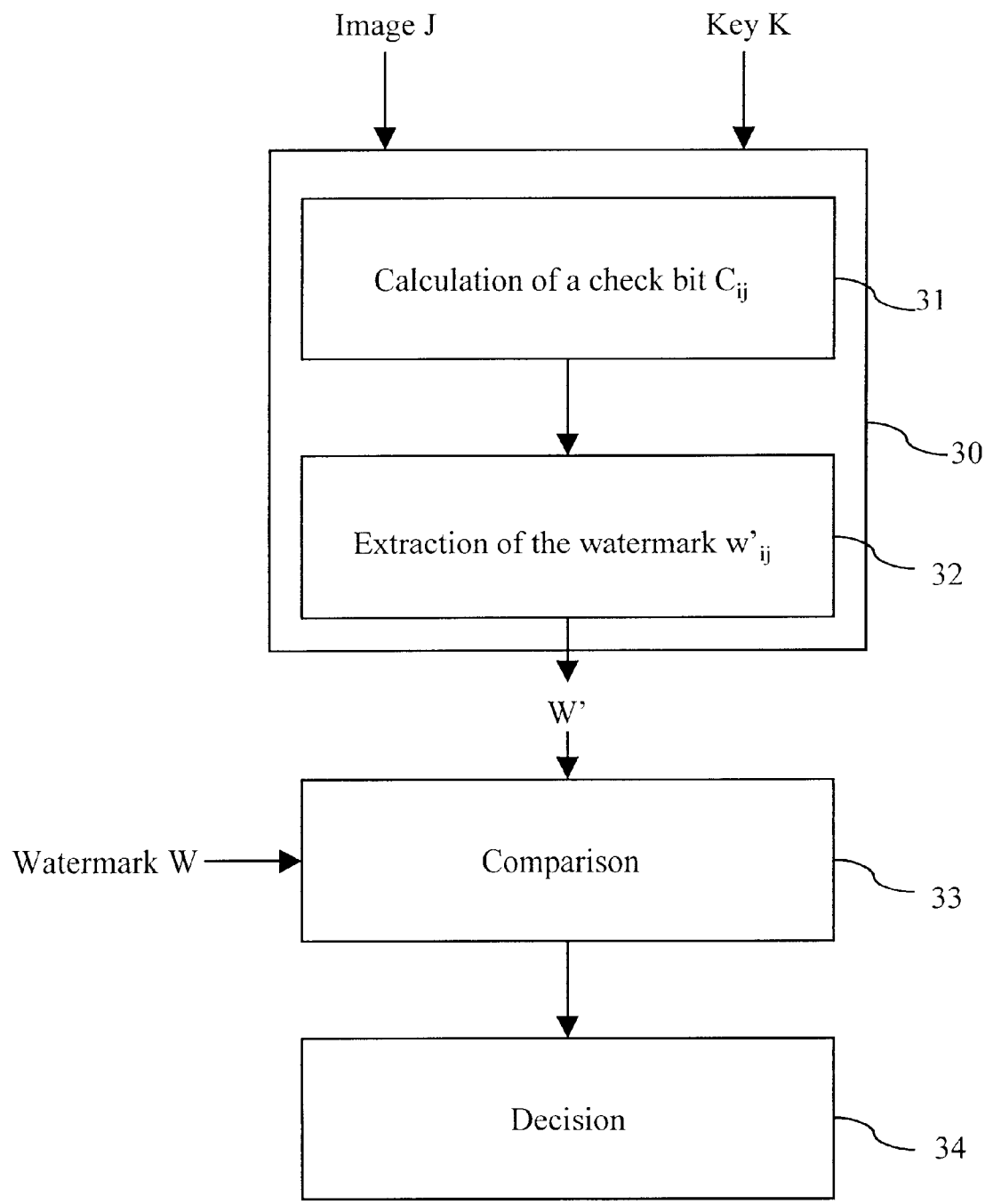
FIG. 2 is a block diagram illustrating an authentication device according to the invention.

The image I' can undergo various distortions (compression and decompression, filtering, digital to analogue conversion in order to be displayed, etc.) so that an image J is transmitted at the input of an authentication device partly similar to a decoder 30 as depicted in FIG. 2. The purpose of the authentication device is to indicate whether the image J is indeed the image I' which was transmitted.

For this purpose, the authentication device according to the invention has:
- means 31 of calculating a check bit $C_{ij}$ according to the same predetermined operation, used on coding, as a function of L-M first bit planes of a coefficient $X_{ij}$;
- means 32 of extracting the value $w'_{ij}$ from the additional information item inserted in accordance with the predetermined rule reversible as a function of the check bit $C_{ij}$ and M last bit planes of the coefficient $X_{ij}$.

The decoder 30 thus makes it possible to find the additional information $w'_{ij}$ inserted in the noisy image J from the 1 or 2 last bit planes of the coefficient $X_{ij}$.

The authentication device also has:
- means 33 of comparing the extracted value $w'_{ij}$ of the inserted additional information and the binary value $w_{ij}$ of the additional information item W; and
- means 34 of deciding whether or not to authenticate the digital signal J according to whether the extracted value $w'_{ij}$ and the binary value $w_{ij}$ of the inserted additional information item W are identical or not.

The means 21 and 31 of calculating a check bit $C_{ij}$ for each coefficient $X_{ij}$ are identical in the insertion device and in the authentication device.

Preferably, the predetermined operation implemented by these calculation means 21, 31 is a function of the first L-M bit planes of the coefficient $X_{ij}$ and of a confidential key K also represented in L bits.

Using a confidential key is useful for making the inserted information secure. By way of example, there can be one key per image I to be authenticated or one key for a set of images I, or a single key per type of apparatus which creates or stores the images, for example a digital photographic apparatus.

Figure 3:
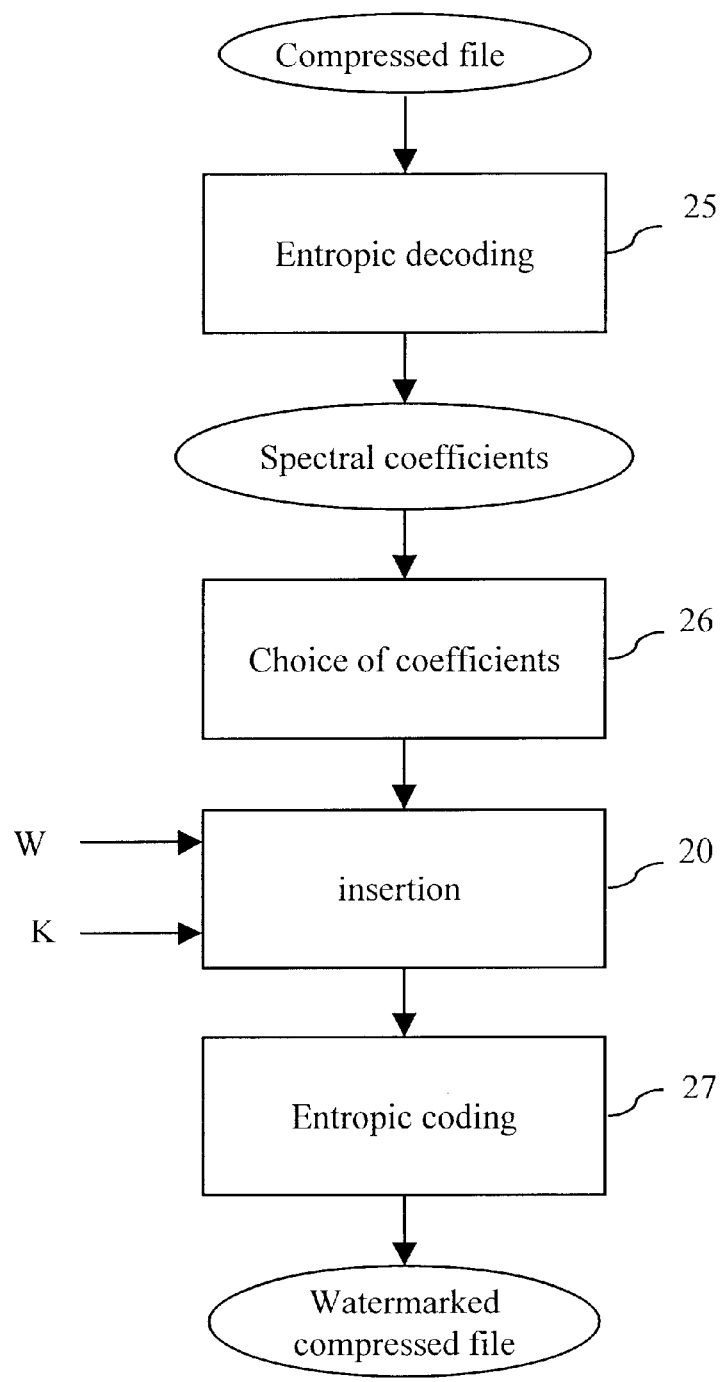
FIG. 3 is a block diagram illustrating an insertion device used for inserting an additional information item in a compressed digital data file.

In a preferred embodiment of the invention, which is particularly advantageous when it is wished to authenticate images which are compressed in order to be stored in a compressed file, the insertion device as illustrated in FIG. 3 also has entropic decoding means 25 adapted to extract the quantized spectral coefficients $X_{ij}$. In particular the insertion device can thus process a file compressed in accordance with the JPEG (Joint Photographic Expert Group) standard, in which the digital signal is decomposed by a spectral transformation, then quantized and finally coded by an entropic coding method such as an arithmetic coding or a Huffman coding.

The digital signal being decomposed into a set of quantized spectral coefficients at the output of the entropic decoding means 25, means 26 choosing a subset of quantized spectral coefficients are adapted to choose coefficients $X_{ij}$ having at least one magnitude strictly greater than zero.

It is possible to fix a strictly positive threshold value and to choose only quantized spectral coefficients $X_{ij}$ whose magnitude is greater than this threshold value.

In this embodiment, the insertion device also has entropic coding means 27 which enable the digital file including the watermark to be compressed once again.

Figure 4:
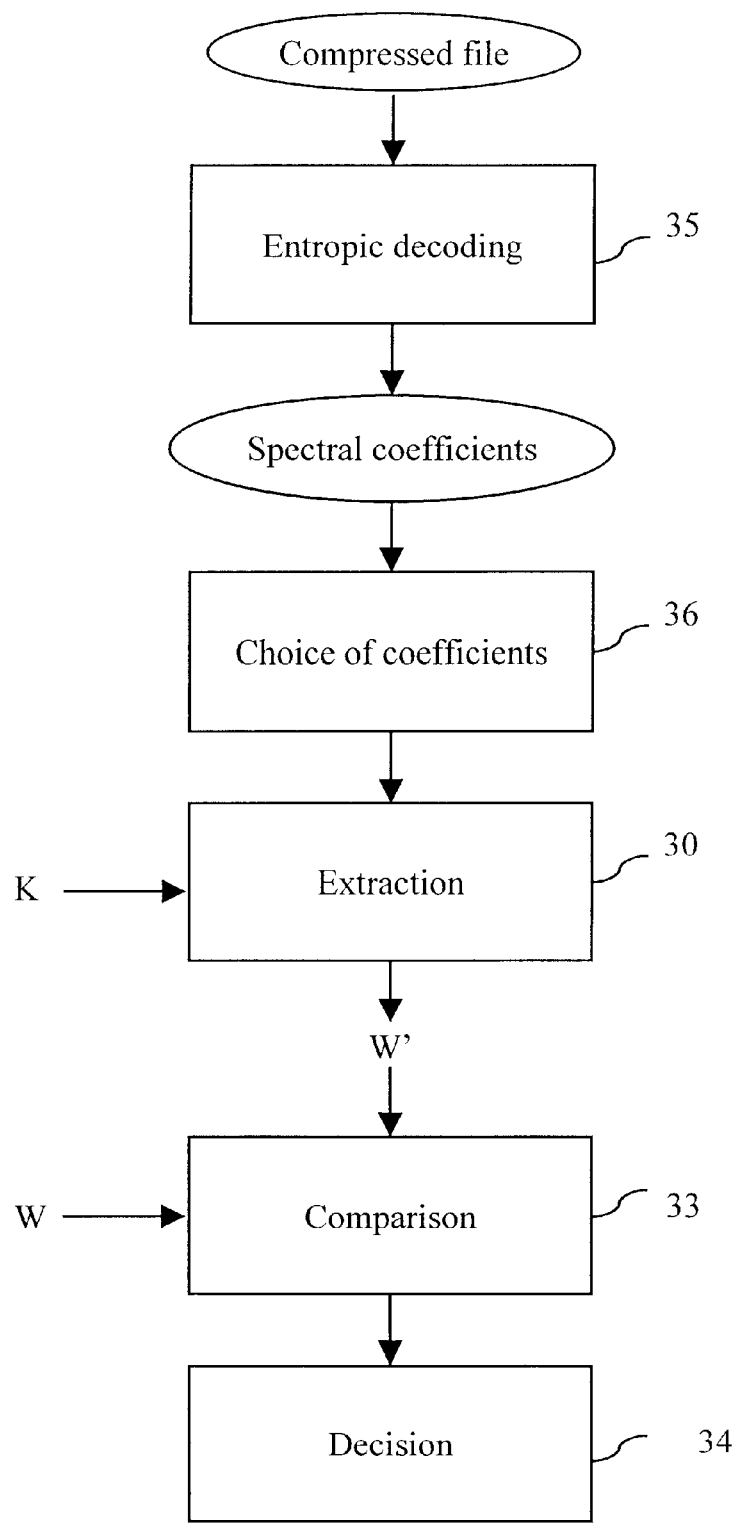
FIG. 4 is a block diagram illustrating an authentication device used for authenticating a compressed file.

As illustrated in FIG. 4, in an entirely similar fashion, the authentication device also has decoding means 35, similar to the entropic decoding means 25, adapted to extract quantized spectral coefficients from a compressed file.

Choosing means 36, identical to the choosing means 26 of the associated insertion device, makes it possible to find the subset of coefficients $X_{ij}$ in which the additional information item was inserted.

Figure 5:
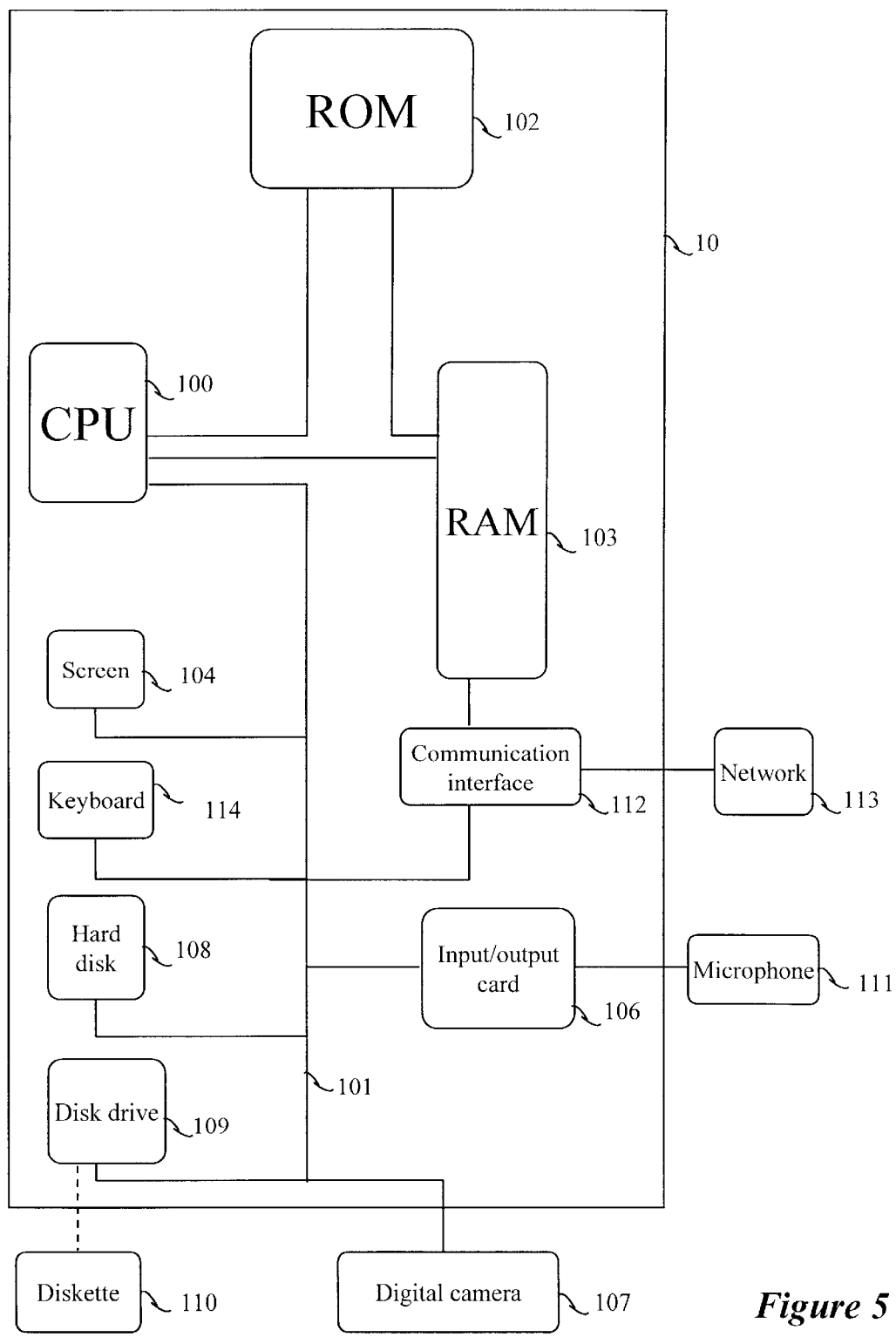
FIG. 5 is a block diagram illustrating a computer adapted to implement the insertion and/or authentication method according to the invention.

The insertion device and the authentication device can be incorporated in a microprocessor 100 of a computer 10 as illustrated in FIG. 5.

A read only memory, or ROM memory, 102 comprises a program for inserting an additional information item in a digital signal and a program for authenticating the digital signal from the inserted additional information item, and a random access memory, or RAM memory, contains registers adapted to record variables modified during the running of the program.

Notably, the random access memory comprises a register for recording the set of coefficients $X_{ij}$ representing the digital signal such as an image I to be authenticated, a register for recording the check bit $C_{ij}$ and a register for recording the last M bit planes modified.

The microprocessor 100 integrated in the computer 10 can be connected to different peripherals, for example a digital camera 107 or a microphone 111, by means of an input/output card 106 in order to receive and store documents (images, audio signal, etc.).

This computer 10 has a communication interface 112 connected to a communication network 113 also adapted to transfer documents to be authenticated to the computer 10.

The computer 10 also has document storage means, such as a hard disk 108.

It can also be adapted to cooperate by means of a disk drive 109, for example with removable document storage means such as diskettes 110.

These fixed or removable storage means can also contain the code of the insertion or authentication method according to the invention, which, once read by the microprocessor 100, will be stored in the hard disk 108.

By way of variant, the program enabling the insertion or authentication device to implement the invention can be stored in the read only memory 102.

In a second variant, the program can be received in order to be stored as described above by means of the communication network 113.

The computer 10 also has a screen 104 serving, for example, as an interface with an operator by means of the keyboard 114 or a mouse or any other means. The operator can thus modify certain parameters of the insertion or authentication device, such as for example the threshold value used for choosing a subset of coefficients.

The central unit 100 will execute the instructions relating to the implementation of the invention. On powering up, the programs and methods relating to the invention stored in a non-volatile memory, for example the read only memory 102, are transferred into the random access memory 103, which will then contain the executable code of the invention as well as the variables necessary for implementing the invention.

The communication bus 101 affords communication between the different sub-elements of the computer 10 or connected to it. The representation of the bus 101 is not limitative and notably the processor 100 is able to communicate instructions to any sub-element directly or by means of another sub-element.

In practice, the insertion device and the authentication device can be incorporated in the same computer 10 or in two distinct computers 10 connected for example by the communication network 113.

In general terms, the insertion device and authentication device are incorporated together or separately in a digital signal processing apparatus, such as a digital photographic apparatus or a digital camera which create and store a digital image, in compressed form.

A description will now be given of a first embodiment of the insertion method and associated authentication method with reference to FIGS. 6 to 9.

In this example, it is considered that the digital signal is an image I stored in a compressed file. This image I has been compressed using a compression algorithm based on the JPEG standard as normally used in various image processing appliances, notably in a digital photographic apparatus. The image is thus decomposed in a spectral domain by a discrete cosine transformation (DCT), and then quantized, for example by a scalar quantization technique. The set of quantized spectral coefficients, denoted $X_{ij}$ in the remainder of this description, is next coded by an entropic coding.

The insertion method according to the invention includes first of all a preliminary step of entropic decoding E1 adapted to extract the quantized spectral coefficients $X_{ij}$.

Figure 8:
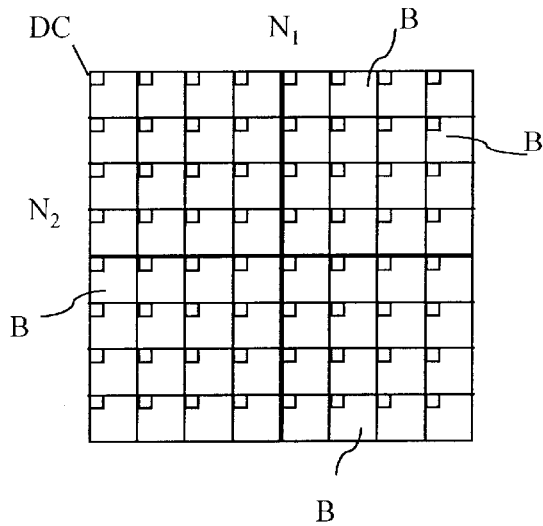
FIG. 8 is a diagram illustrating a spectral representation of an image to be authenticated.

In this way a set of coefficients $X_{ij}$ structured as illustrated in FIG. 8 is obtained for an image I of size N1 by N2 with N1 and N2 divisible by eight. The image I is thus decomposed into a set of blocks of 64 coefficients $X_{ij}$, a first coefficient being the continuous coefficient DC (low-frequency coefficient in the DCT spectral decomposition) followed by 63 other AC coefficients (high-frequency coefficients).

In this example, it is assumed that each coefficient $X_{ij}$ is represented in 16 bits and that there is a confidential key K, also defined in 16 bits.

The watermark is, in this example, a binary image, representing a logo for example, generated by the repetition of an initial binary information item of smaller size than the size N1 by N2 of the set of quantized spectral coefficients $X_{ij}$.

The initial binary information can thus have a resolution 8 times smaller than the image I to be treated. Each initial binary information bit is repeated 8 times in each direction so as to have a binary image to be inserted W of the same size as the image I to be processed and such that each 8 by 8 block of the binary image W contains the same information bit.

The binary image W is thus formed by a set of coefficients $w_{ij}$ equal in number to that of the quantized spectral coefficients $X_{ij}$ representing the image I to be processed.

The advantage of using such a binary image W for inserting the watermark will be more clearly understood in the remainder of the description of the insertion method.

First of all, in a reading step E2, the first coefficient $X_{ij}$ is considered in a predetermined order of scanning of the set of coefficients $X_{ij}$ where i varies between 1 and N1 and j between 1 and N2.

In a choosing step E3, the magnitude of the coefficient is compared with a threshold value T.

If the magnitude of the coefficient is less than the threshold value T, this coefficient $X_{ij}$ is not modified and the following coefficient is read directly in a step E4.

The remainder of the steps of the insertion method are thus implemented only for the coefficients $X_{ij}$ whose magnitude is greater than this threshold value T.

At a minimum, only the coefficients $X_{ij}$ which have a magnitude strictly greater than zero will be chosen in order not to modify the spectral coefficients which are set to zero by the quantization method used during the compression of the image I. This precaution makes it possible to keep the nil coefficients of the quantized spectral decomposition of the image and thus not to substantially increase the size of the compressed file by inserting an additional information item.

Preferably, a strictly positive threshold value T is chosen, for example equal to 3, so that the modification of the least significant bit planes is of little importance with regard to the magnitude of the coefficients.

In addition, the threshold value chosen must make it possible to find, during the authentication of the image I, all the coefficients which have been able to modified by the insertion of the watermark. This threshold value T must thus be chosen so that all the coefficients, even after modification of the last M bit planes, always have a magnitude strictly greater than this threshold value.

In general terms, this threshold value T complies with the rule:

$$T = k.2^M - 1$$

where M is the number of bit planes to be modified in the coefficients $X_i$ and k any strictly positive integer.

The value chosen in this example, equal to 3, is perfectly suited to the modification of one or two last bit planes.

It can also be decreed that all the low-frequency coefficients DC will be chosen for the insertion of the additional information item, independently of their magnitude.

It will thus be understood that at least one coefficient $X_{ij}$ of each 8 by 8 block of the DCT spectral decomposition of the image is modified so that the binary information obtained in each 8 by 8 block of the binary image W to be inserted can be inserted. Thus, by virtue of the construction of a binary image W as described above, containing the same information bit in each 8 by 8 block, it is ensured that this information bit will be inserted at least once in the image I to be processed.

In accordance with the invention, for each chosen coefficient $X_{ij}$, there is calculated, in the calculation steps E5 to E6, a check bit $C_{ij}$, in accordance with a predetermined operation as a function of L-M first bit planes of the coefficient $X_{ij}$, and, in this example, also as a function of the confidential key K.

This predetermined operation consists for example of effecting, in a first step E5, a sum S of binary operations on the first L-M bit planes of the coefficient $X_{ij}$ and the first L-M bit planes of the confidential key K and calculating in a second step E6, the check bit $C_{ij}$ as a function of the parity of this sum S.

There is chosen, in this example of embodiment, a number M equal to 1 of least significant bits to be modified so that the first 15 bit planes of the coefficient $X_{ij}$ are used for calculating the check bit $C_{ij}$.

Figure 9:
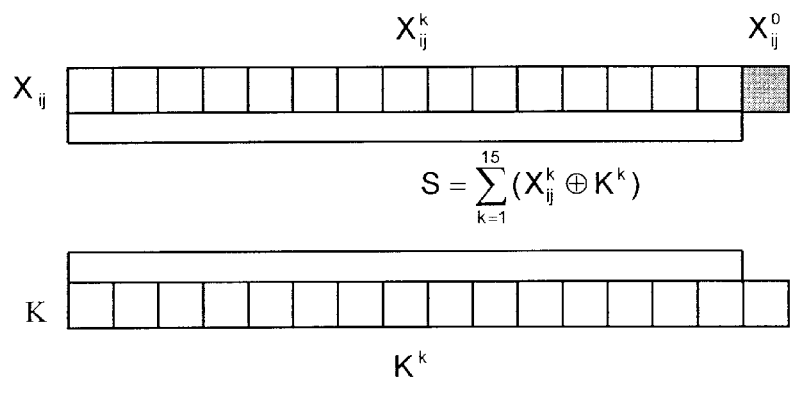
FIG. 9 is a diagram illustrating a step of the insertion method according to the first embodiment.

With reference to FIG. 9, and denoting $X^k_{ij}$ the bit planes of the coefficient $X_{ij}$ with k varying from 0 to 15 from the least significant bit plane to the most significant bit plane, the sum is for example calculated bit by bit between the first 15 bit planes of $X_{ij}$ and the first 15 bit planes of K. The result $$S = \sum_{k=1}^{15} X^k_{ij} XOR K^k$$

is denoted S.

In this example, the operator XOR is the binary exclusive OR operation (the result is equal to 0 if the bits are different and to 1 if the bits are identical).

Naturally, other conventional operators could be used, such as for example the "AND" operator (the result is equal to 1 if the two bits are equal to 1 and 0 otherwise) or the non-exclusive OR operator (the result is equal to 0 if the two bits are equal to 0 and 1 otherwise). Any binary operation reproducible to the decoder can be used.

The check bit $C_{ij}$ is next calculated as being the parity of the sum S: $C_{ij}=0$ if S is even and $C_{ij}=1$ if S is odd. It is also possible to write $C_{ij}=S$ (modulo) 2.

The last bit plane $X^0_{ij}$ is next calculated, in a calculation and substitution step E7, in accordance with a predetermined rule which is reversible as a function of the check bit $C_{ij}$ and the binary value $w_{ij}$ of the additional information item W, having the same location in the matrix representing the binary image W as the coefficient $X_{ij}$ in the spectral representation matrix of the image I, and the least significant bit of the coefficient X, is replaced by the last calculated bit plane $X^0_{ij}$.

In this example, the value of the last bit plane $X^0_{ij}$ is equal to the value of the check bit $C_{ij}$ or to the alternative value $1-C_{ij}$ of the check bit according to the state of the binary value $w_{ij}$ of the additional information W.

It is tested for example in a step E8 whether the binary value $w_{ij}$ is equal to 0. In the affirmative, $X^0_{ij}=C_{ij}$.

Otherwise, that is to say if $w_{ij}$ is equal to 1, $X^0_{ij}=1-C_{ij}$.

Any reversible rule, then making it possible to know the value of $w_{ij}$ from the values of the last bit plane $X^0_{ij}$ and check bit $C_{ij}$, can be used.

A test step E9 checks whether all the coefficients $X_{ij}$ have been envisaged. If not, the following coefficient is considered in the order of scanning at the reading step E4 and steps E3 to E9 of the insertion method are reiterated.

When all the quantized spectral coefficients $X_{ij}$ have been scanned, entropic coding is once again carried out in a step E10 of coding all the coefficients so as to reconstitute a compressed file containing the watermarked image.

By virtue of the insertion method according to the invention, the inserted additional information W is imperceptible and does not modify the visual perception of the image. This watermark can also convey additional information with the image.

Although only the last bit plane carries information, given that the substitution rule for the last bit planes takes into account several parameters, the distribution of these modified bits will be of the random type. A fraudulent modification of these last bit planes, in order to mask a modification of the image, will be very difficult to carry out since it is impossible to deduce the link existing between an inserted information bit, equal to 0 or 1, and the modified bit or bits.

It will also be noted that the operations implemented directly on the quantized spectral coefficients have a low algorithmic complexity, whence a rapid insertion of the additional information in a compressed file.

It makes it possible directly to authenticate an image in its compressed format and is intrinsically robust to the compression methods spaced on the JPEG standard.

This inserted watermark W is also fragile to all modifications which the image I may undergo, intentionally or otherwise, in its compressed form, so that it can indeed serve thereafter to authenticate the image or not.

Figure 7:
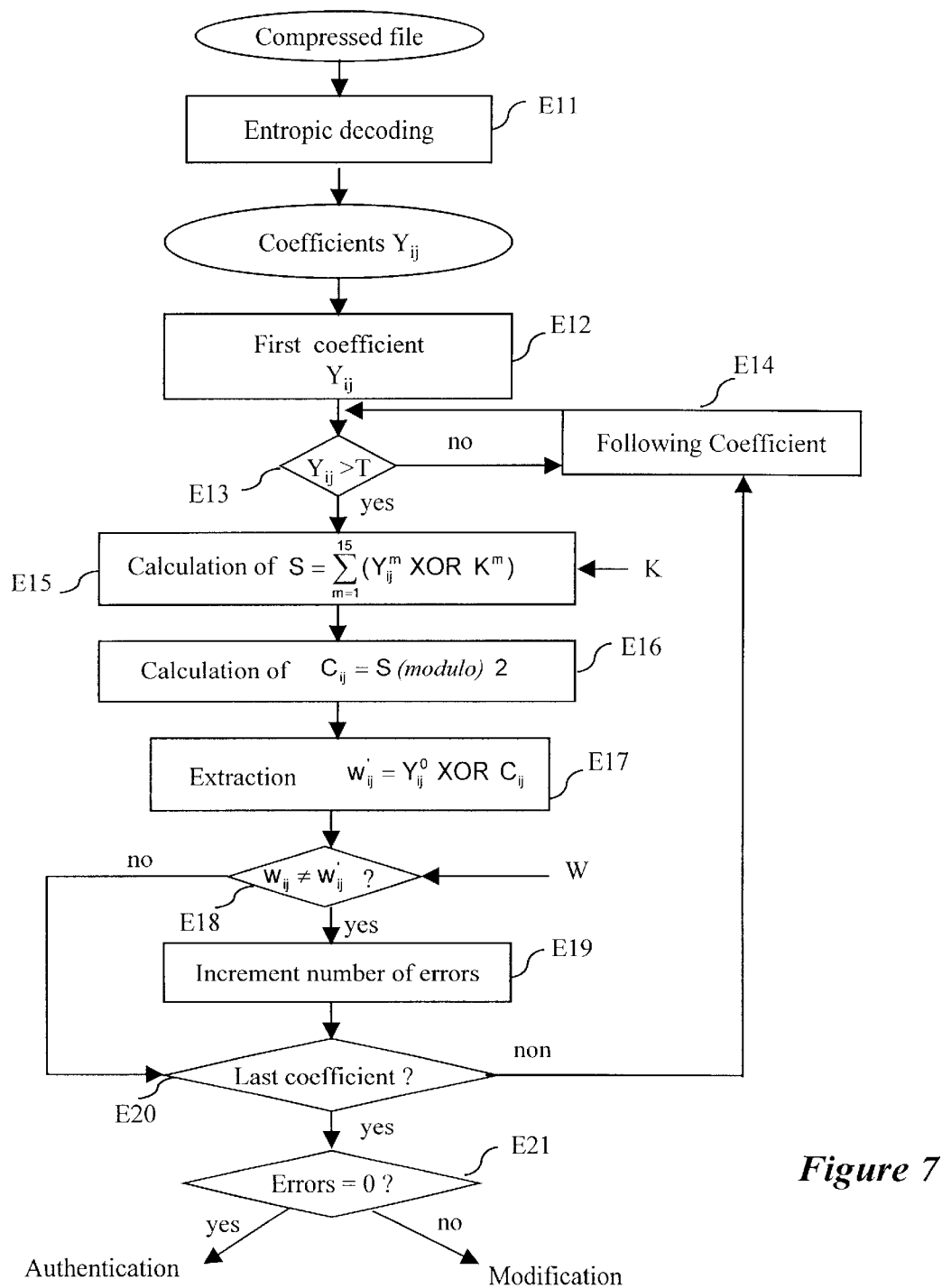
FIG. 7 is an algorithm of the authentication method according to the first embodiment.

For this purpose, and as illustrated in FIG. 7, the authentication method associated with the insertion method in this embodiment includes first of all an entropic decoding step E11 in order to extract all the quantized spectral coefficients $Y_{ij}$ of the compressed file supplied at the input of the decoder. It is necessary for the image J to be authenticated to be exactly in the same format as the original image I.

As before, the first coefficient $Y_{ij}$ is considered in a predetermined scanning order at the reading step E12 and, in a test step E13, the magnitude of this coefficient $Y_{ij}$ is compared with a threshold value T identical to that used in the insertion method. If the magnitude of this coefficient $Y_{ij}$ is less than the threshold value T, the following coefficient is considered in a reading step E14.

In this way the subgroup of coefficients $Y_{ij}$ in which the additional information W has been inserted is reconstituted.

Next, in the calculation steps E15 to 16, the check bit $C_{ij}$ is calculated in accordance with the same predetermined operation as before as a function of the first 15 bit planes of the coefficient $Y_{ij}$ and the first 15 bit planes of the confidential key.

As before, the predetermined operation consists of effecting a sum S of binary operations, by means of the exclusive binary OR operator, on the first 15 bit planes of the coefficient and the first 15 bit planes of the confidential key K, and calculating the check bit $C_{ij}$ as a function of the parity of this sum S.

It will be noted that, by virtue of the insertion method according to the invention, the check bit $C_{ij}$ is calculated from the bit planes of the coefficient which have not been modified in order to insert the additional information. A check bit $C_{ij}$ is therefore found at the calculation step E16, identical to the check bit $C_{ij}$ calculated at the time of the insertion method if the image to be authenticated J is identical to the original image.

The authentication method next includes a step E17 of extracting the value of the inserted additional information item $w'_{ij}$ in accordance with the reversible predetermined rule used at the time of insertion, as a function of the check bit $C_{ij}$ and the value of the last bit plane $Y^0_{ij}$ of the coefficient $Y_{ij}$.

The value of the additional information $w'_{ij}$ is equal to one state or another state, for example equal to 0 or 1, depending on whether or not the value of the last bit plane $Y^0_{ij}$ and the value of the check bit $C_{ij}$ are equal.

With the rule used before:

if $Y^0_{ij}=C_{ij}$, then $w'_{ij}=0$; and if $Y^0_{ij}=1-C_{ij}$, then $w'_{ij}=1$.

It is also possible to write, in summary, $w'_{ij}=C_{ij}$ XOR $Y^0_{ij}$

It is thus possible to extract all the values $w'_{ij}$ of the additional information W which are deemed to have been inserted by modulation of the last bit plane $Y^0_{ij}$ of the coefficients $Y_{ij}$.

The authentication method next includes a step E18 of comparing the extracted value $w'_{ij}$ of the additional information item inserted and the binary value $w_{ij}$ of the additional information.

If these two values $w'_{ij}$ and $w_{ij}$ are different, an error counter is incremented in a step E19.

Next, in a test step E20, it is checked whether all the coefficients $Y_{ij}$ have been considered and, in the negative, the following coefficient is considered in the order of scanning and steps E13 to E20 of the authentication method are reiterated.

Finally, the latter includes a decision step E21 which makes it possible to authenticate or not the image J as being the original image I as a function of the number of errors recorded in the error counter.

If the total number of errors is equal to zero, it can be concluded reliably that the processed image J is indeed the original image I.

If the number of errors is different from zero, it is deduced therefrom that the image has been manipulated. A majority decision rule can optionally be adopted and it can be decided that the image has been manipulated only if the majority of the extracted values $w'_{ij}$ are different from the values $w_{ij}$ of the additional information item W deemed to have been inserted.

One advantage of the insertion and authentication method according to the invention lies in the possibility of locating in frequency (as a function of the spatial medium of the coefficient $X_{ij}$ in the spectral representation image) any modifications which have been made on the image and, if applicable, of knowing the type of distortion applied to the image.

A description will now be given, with reference to FIGS. 10 to 12, of a second embodiment of the invention.

Only the steps of the insertion and authentication methods which have been modified compared with the first example embodiment described above, will be described in detail below, the identical steps bearing identical numerical references in the figures.

In this second embodiment the insertion of the additional information item W is also performed in a compressed file using a coding method based on the JPEG standard, but, unlike the previous example, the number M of bit planes substituted at the time of insertion is equal to 2.

The secret image to be inserted W is created as in the previous example from an image with a resolution 8 times smaller than the image to be processed I.

As before, an entropic decoding step E1 extracts the quantized spectral coefficients $X_{ij}$ and a test step E3 chooses a subset of coefficients $X_{ij}$ whose magnitude is greater than a threshold value T.

In addition, in this example, it is ordained that all the low-frequency coefficients C will be kept unchanged.

As before, the coefficients $X_{ij}$ are represented in 16 bits and a confidential key K, also represented in 16 bits, is used.

Figure 10:
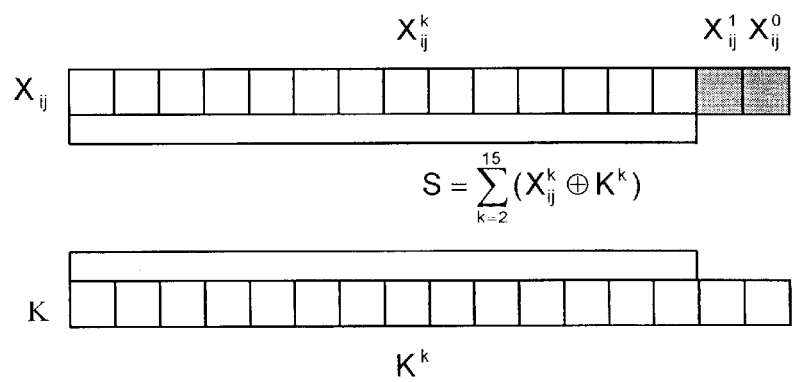
FIG. 10 is a diagram illustrating a step of the insertion method according to a second embodiment of the invention.
Figure 11:
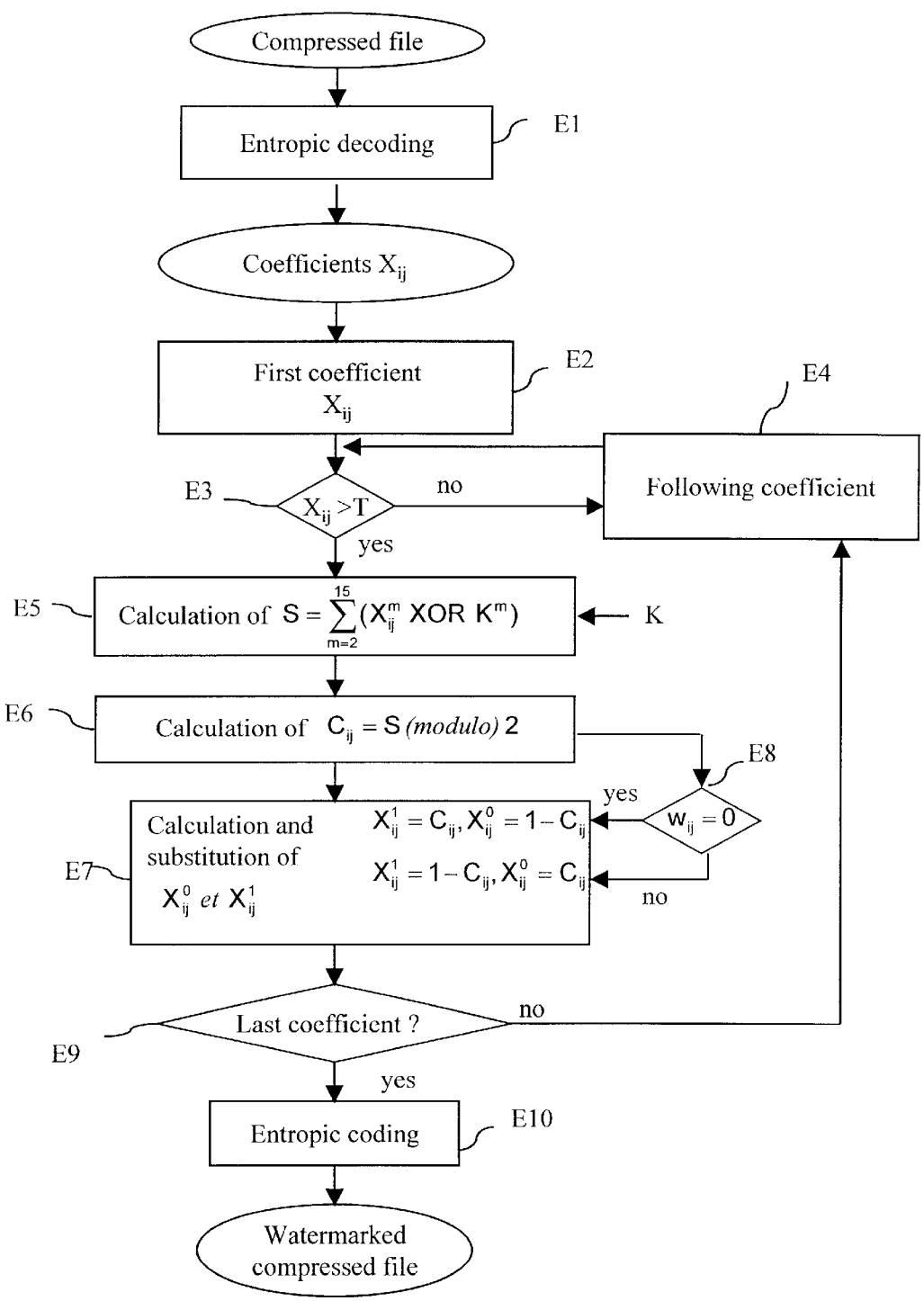
FIG. 11 is an algorithm of the insertion method according to the second embodiment of the invention.

As illustrated in FIG. 10, a check bit $C_{ij}$ is calculated at the calculation steps E5 and E6.

At step E5 a sum S is calculated bit by bit between the first 14 bit planes of the coefficient $X_{ij}$ and the first 14 bit planes of the confidential key K:

$$S = \sum_{k=2}^{15} X_{ij}^k \, XOR \, K^k$$

Next the check bit $C_{ij}$ is calculated as a function of the parity of the sum S, that is to say $C_{ij}=0$ if S is even and $C_{ij}=1$ if S is odd.

At the step of calculating and substituting the last two bit planes $X^0_{ij}$ and $X^1_{ij}$, the following deterministic rule is used:

if $w_{ij}=0$, $X^1_{ij}=C_{ij}$ and $X^0_{ij}=1-X^1_{ij}$; and
if $w_{ij}=1$, $X^1_{ij}=1-C_{ij}$ and $X^0_{ij}=1-X^1_{ij}$ Thus, in this embodiment in which the number M of substituted bit planes is equal to 2, the value of the penultimate bit plane $X^1_{ij}$ is equal to the alternative value of the last bit plane $X^0_{ij}$.

In a test step E9, it is checked that all the coefficients $X_{ij}$ have been processed, and then an entropic coding step E10 compresses the watermarked image I' once again in a file.

Figure 12:
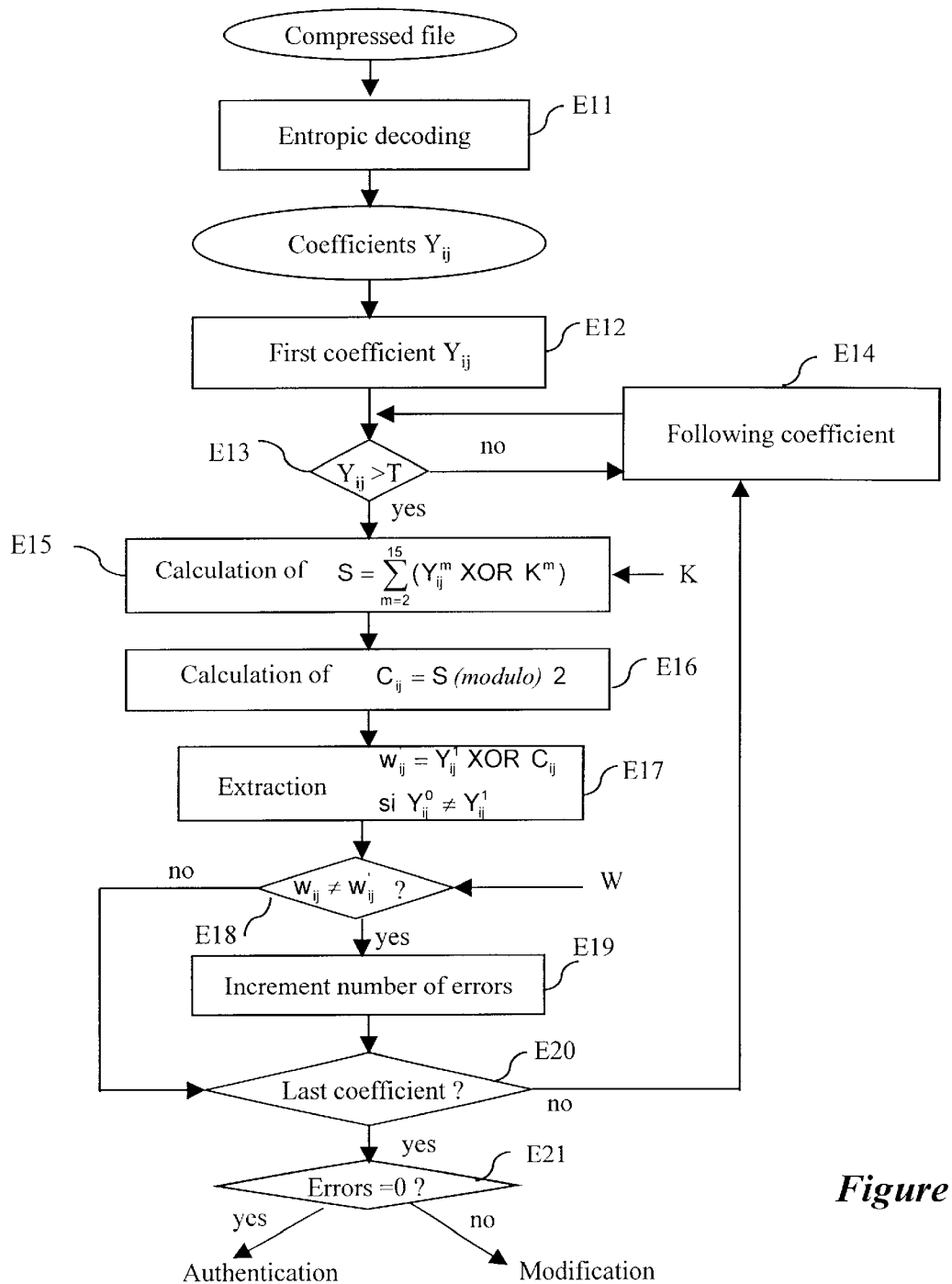
FIG. 12 is an algorithm of the authentication method according to the second embodiment.

As illustrated in FIG. 12, in order to authenticate an image J stored in a compressed file, an entropic decoding E11 of the file is once again carried out in order to extract the quantized spectral coefficients $Y_{ij}$ of the file and once again a subset of coefficients is chosen whose magnitude is greater than the threshold value T used at the time of insertion of the additional information item W.

Next the check bit $C_{ij}$ is calculated as before from the first 14 bit planes of a coefficient $Y_{ij}$ and the first 14 bit planes of the confidential key K.

Next the deterministic rule used at the time of substitution of the last two bit planes is reversed in order to extract the value $w'_{ij}$ of the inserted binary information:

if $Y^1_{ij}=C_{ij}$ and $Y^0_{ij}=1-Y^1_{ij}$, then $w'_{ij}=0$
if $Y^1_{ij}=1-C_{ij}$ and $Y^0_{ij}=1-Y^1_{ij}$, then $w'_{ij}=1$
if $Y^1_{ij}=Y^0_{ij}$, then the information $w'_{ij}$ cannot be decoded.

Thus, at the extraction step E17, when the number M of substituted bit planes is equal to 2, the value $w'_{ij}$ of the additional information item is extracted only if the value of the penultimate bit plane $Y^1_{ij}$ is equal to the alternative value of the last bit plane $Y^0_{ij}$.

The steps E18 of comparing the values of the extracted information $w'_{ij}$ and inserted binary information $w_{ij}$, of incrementing E19 an error counter and deciding E21 are identical to those described in the first embodiment.

This embodiment is of interest in particular when a majority decision is taken on the results obtained from the extraction E17 and comparison E18 steps.

Using in this way the last two bit planes of each coefficient in order to insert the modulation, the probability of a spectral coefficient not existing in the original image I (and therefore resulting from a modification of the image I) nevertheless making it possible to extract a correct value of the inserted information $w'_{ij}$ is lower.

In this embodiment it is possible to envisage the distinction between significant errors due to veritable modifications to the image I and small errors due to small variations in luminance (resulting for example from a slight overcompression of the file).

A third embodiment will be described now with reference to FIGS. 13 and 14.

Only the steps of the insertion and authentication methods which have been modified, compared with the example embodiments described above, will be described in detail below, the identical steps bearing identical numerical references in the figures.

In this embodiment, it is considered that the original image I is represented in its spectral domain, in raw data, by a set of pixels $_{ij}$ whose value varies over 256 grey levels, for example.

The image I of size N1 by N2 comprises a set of pixels $I_{ij}$ situated on the $i^{th}$ line and $j^{th}$ column, and coded in this example in 8 bits.

A confidential key K, also represented in 8 bits, is used. In this example, a watermark to be inserted W formed by a binary image of the same size and the same resolution as the original image I is used.

Thus the watermark W comprises a set of information bits $w_{ij}$ situated on the $i^{th}$ line and $j^{th}$ column, i and j varying from 1 to N1 and 1 to N2.

As described below, each information bit $w_{ij}$ of the watermark will be modulated in the original image I and can consequently be extracted for authenticating the image J at the input of a decoder.

Figure 13:
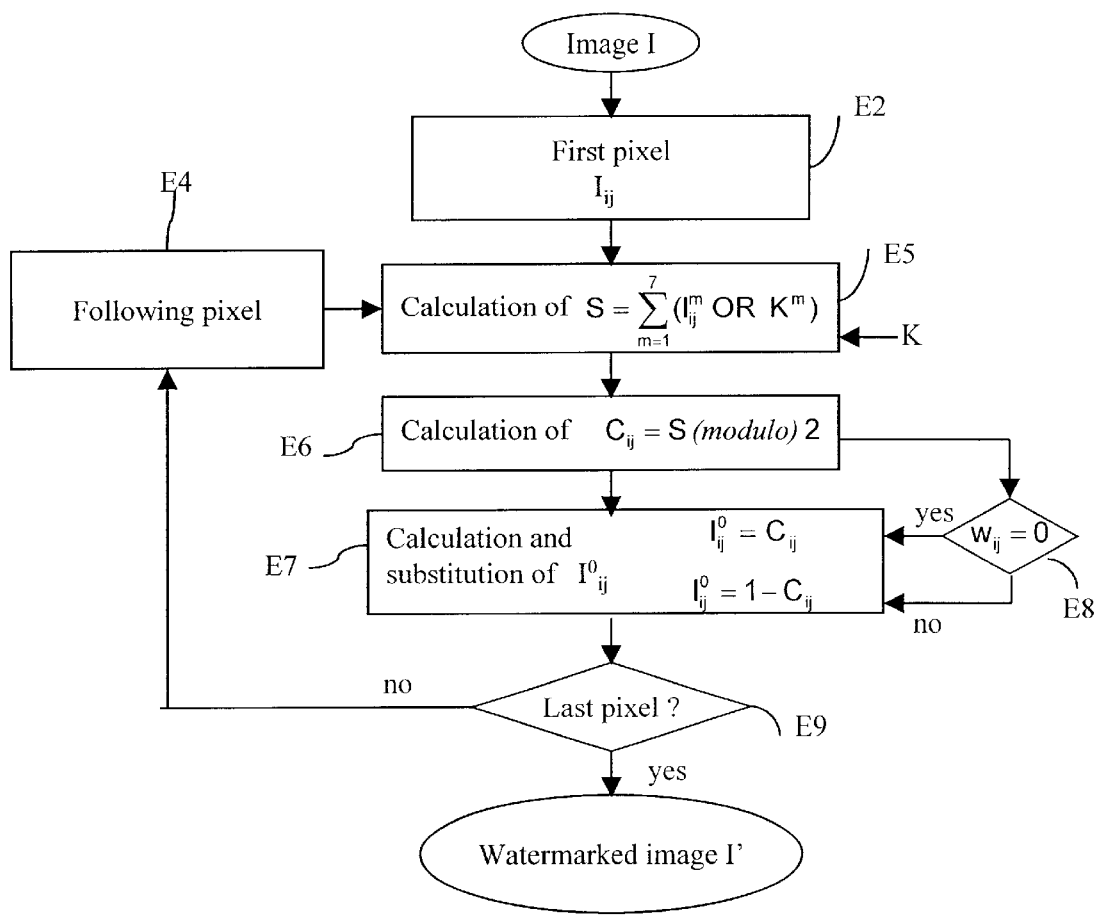
FIG. 13 is an algorithm of the insertion method according to a third embodiment of the invention.

As illustrated in FIG. 13, for inserting the additional information item, in a first step E2 a first pixel $I_{ij}$ is considered, read in a predetermined order of scanning of the image I.

In this example it is chosen to modulate only the last bit plane $I^0_{ij}$ of each pixel $I_{ij}$.

In a calculation step E5, there is calculated a sum S of binary operations effected on the first 7 bit planes of the pixel $I_{ij}$ and on the first 7 bit planes of the confidential key K. In this way the sum S is obtained:

$$S = \sum_{k=1}^{7} I_{ij}^k ORK^k$$

where "OR" represents the binary "OR".

As before, the check bit $C_{ij}$ is next calculated in a calculation step E6, as a function of the parity of the sum S.

At the test step E8 the value of the binary information to be inserted $w_{ij}$ is next read and the following rule is used for calculating and substituting the least significant bit plane at the substitution step E7:

if $w_{ij}=0$, then $I^o{}_{ij}=C_{ij}$, and
if $w_{ij}=1$, then $I^o{}_{ij}=1-C_{ij}$ A test step E9 checks whether all the pixels $I_{ij}$ have been considered and, in the negative, the following pixel is considered at the reading step E4, and steps E5 to E9 of the insertion method are reiterated.

In this way a watermarked image I' is obtained which makes it possible to protect the original image I in its initial spatial representation.

Figure 14:
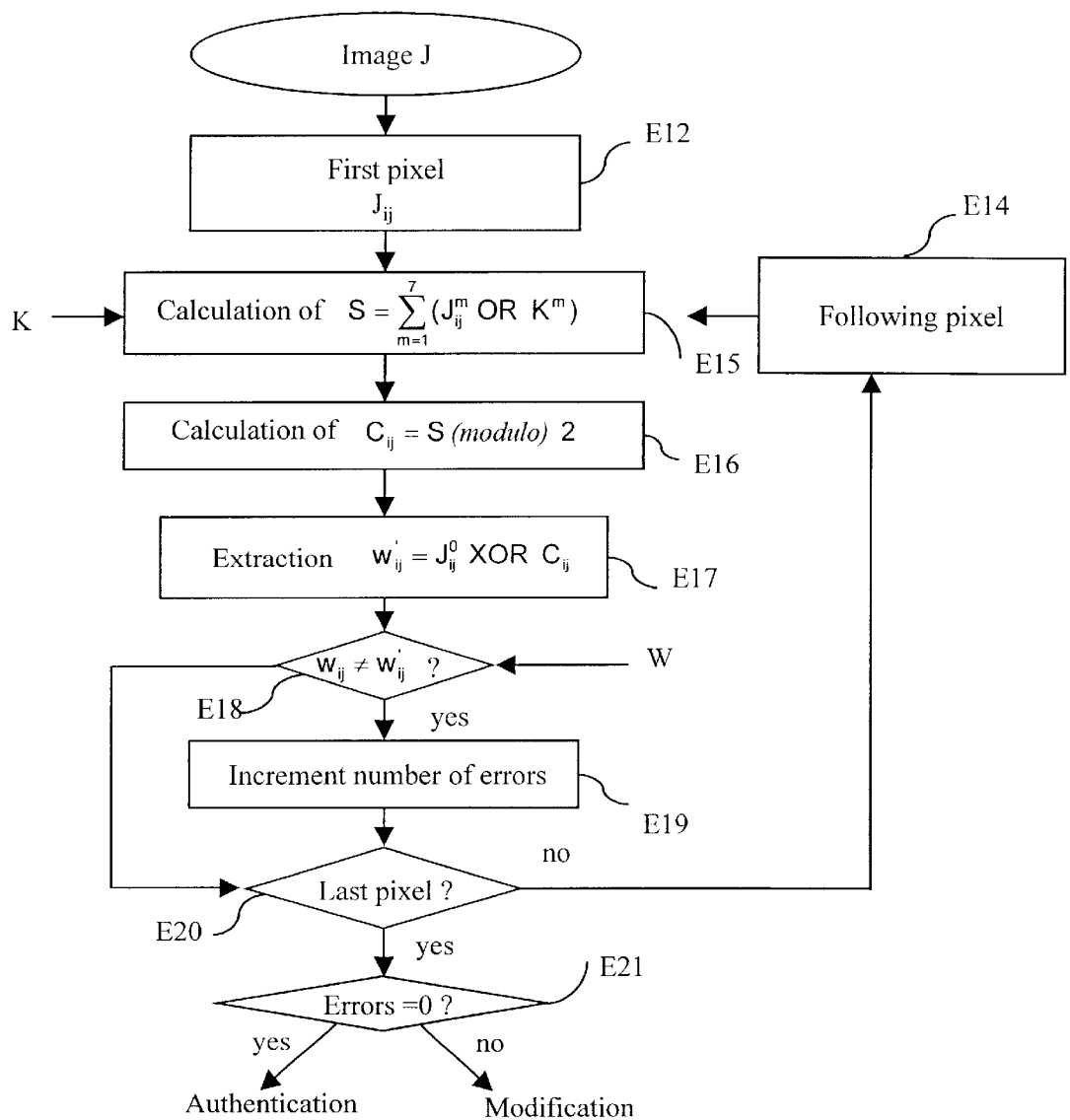
FIG. 14 is an algorithm of the authentication method according to the third embodiment.

In order to authenticate an image J, as illustrated in FIG. 14, the reverse operations are performed on each pixel $J_{ij}$ of the image J in order to extract the value $w'_{ij}$ of the inserted information bit.

At step E12 the first pixel $J_{ij}$, is considered in the predetermined scanning order and, as before, the check bit $C_{ij}$ is calculated at the calculation steps E15 and E16 from the first 7 bit planes of the pixel $J_{ij}$ and the first 7 bit planes of the confidential key K.

The rule used at the time of substitution of the last bit plane $I^o{}_{ij}$ of each coefficient $I_{ij}$ is reversed in order to find the value $w'_{ij}$ of the inserted information bit:

if $J^o{}_{ij}=C_{ij}$, then $w'_{ij}=0$; and
if $J^o{}_{ij}=1-C_{ij}$, then $w'_{ij}=1$.

The extracted value $w'_{ij}$ at the extraction step E17 is then compared with the value $w_{ij}$ which has actually been inserted in a comparison step E18.

An incrementation step E19 increments an error counter for each pixel $J_{ij}$ when the extracted $w'_{ij}$ and inserted $w_{ij}$ values of the information item W are different.

At the test step E20 it is checked whether all the pixels $J_{ij}$ of the image J have been processed and, in the negative, in a reading step E14 the following pixel is considered. Steps E15 to E20 of the authentication method are reiterated on all the pixels $I_{ij}$.

A strict decision step E21 authenticates the image when the number of errors is equal to 0.

As in the previous examples, any local manipulation of the initial image I can be located at each pixel.

The present invention thus makes it possible to authenticate digital data both in compressed form and in non-compressed form.

A description will now be given of another device for inserting an additional information item in digital data, with reference to FIG. 15. In relation to the device in FIG. 1, this device makes it possible to consider parameters representing the data to be processed and to quantize these parameters. The additional information item is then inserted in the quantized parameters. Finally, the processed parameters are dequantized and reinserted in the data. This embodiment thus has a certain tolerance to any over-compression that the watermarked data might undergo.

As above, a digital image I in which a watermark W is to be inserted is considered by way of example.

The image comprises a predetermined number of coefficients.

The watermark is represented here by a set of binary values $w_k$, equal for example to a zero or a one, with a size smaller than that of the set of coefficients of the image.

The insertion device includes:
means 41 of determining a set of parameters representing the image;
means 42 of quantizing the parameters representing the image
means 43 of inserting watermark W in the set of quantized parameters;
means 44 of dequantizing, or reverse quantizing, the parameters processed;
means 45 of inserting the parameters processed by the above means in the image.

Thus, device 40 supplies at the output a watermarked image I' in which the watermark has been inserted in the representative parameters.

Figure 16:
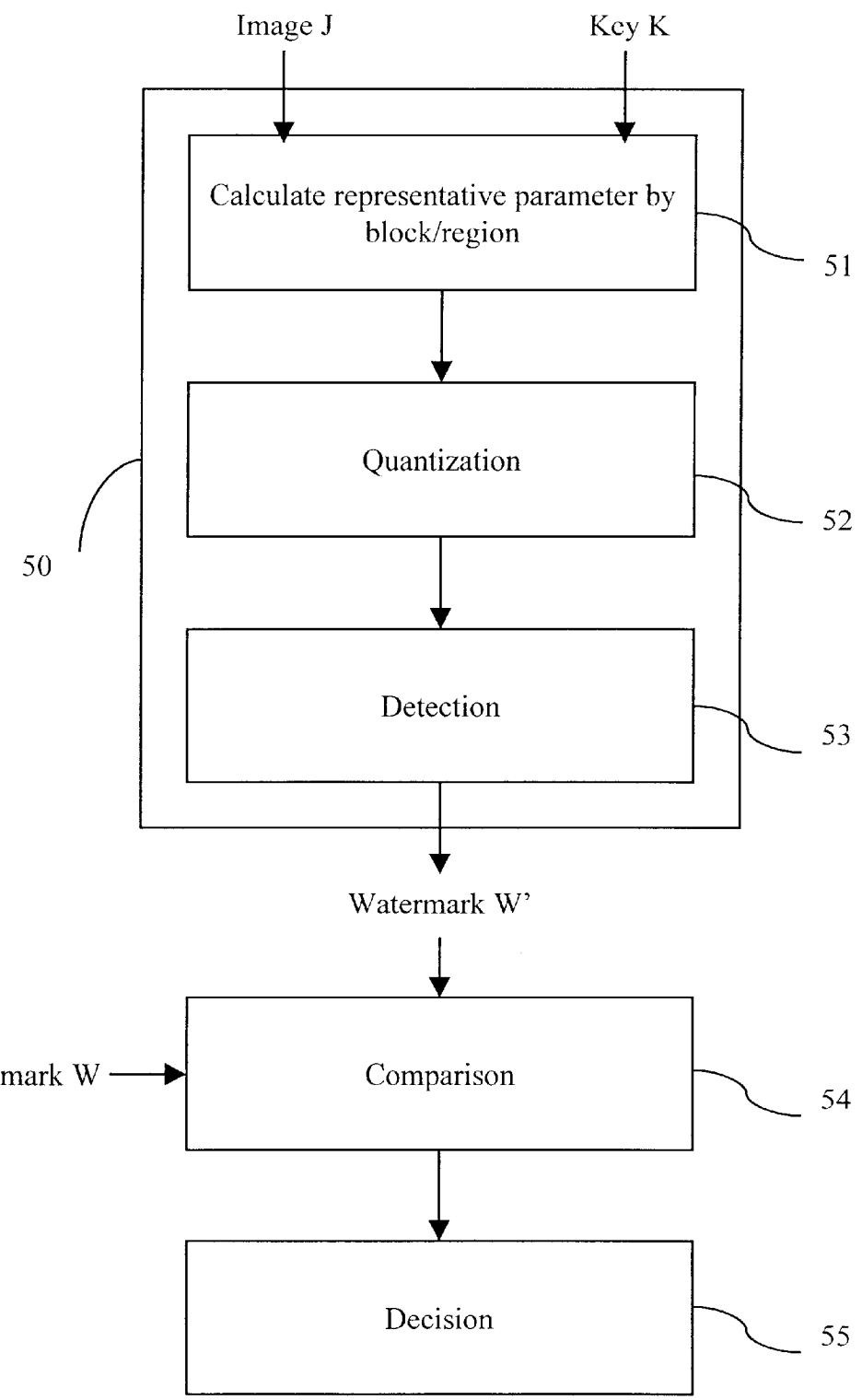
FIG. 16 is a block diagram illustrating another authentication device according to the invention.

As above, image I' can undergo various distortions (compression and decompression, digital to analogue conversion in order to be viewed) in such a way that an image J is transmitted at the input of an authentication device that can be likened, in part, to a decoder 50 such as shown in FIG. 16. The purpose of the authentication device is to indicate whether image J is a modified or identical version of image I' that was transmitted, with a certain tolerance to possible over-compression.

For this purpose, the authentication device according to the invention includes:
means 51 of determining the parameters representing the image, analogous to means 41;
means 52 of quantizing the parameters representing the image, analogous to means 42;
means 53 of detection identical with device 30 described in FIG. 2.

The authentication device also includes
means 54 of comparing the extracted value W' of the additional information item inserted and additional information item W; and
means 55 of deciding whether or not to authenticate digital signal J as a function of the result of the above comparison.

Here again, use can, of course, also be made of a confidential key to make the inserted information secure.

A description will now be given of a fourth embodiment of an insertion method and associated authentication method, corresponding to the operation of the devices described in FIGS. 15 and 16.

Figure 15:
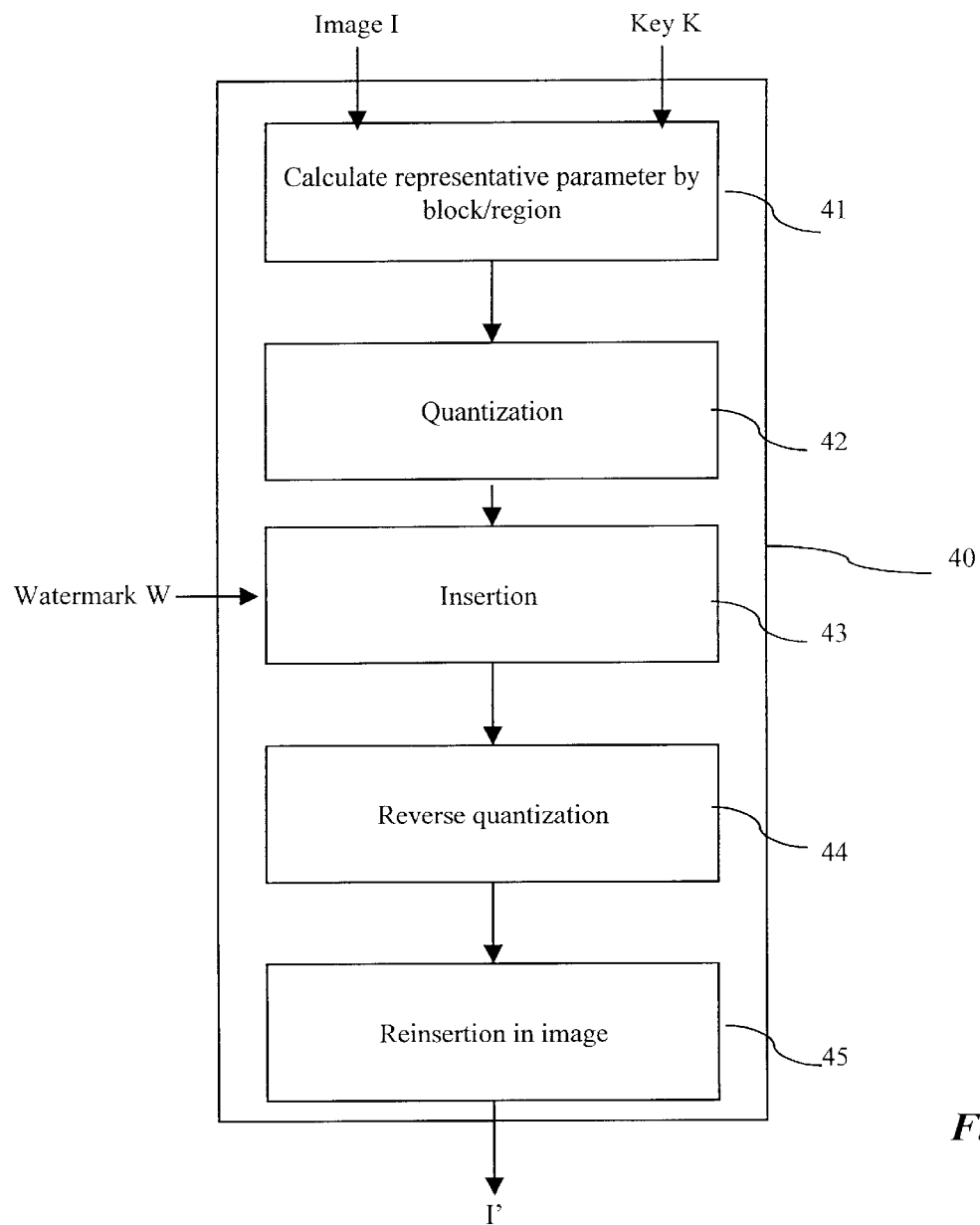
FIG. 15 is a block diagram illustrating another insertion device according to the invention.
Figure 17:
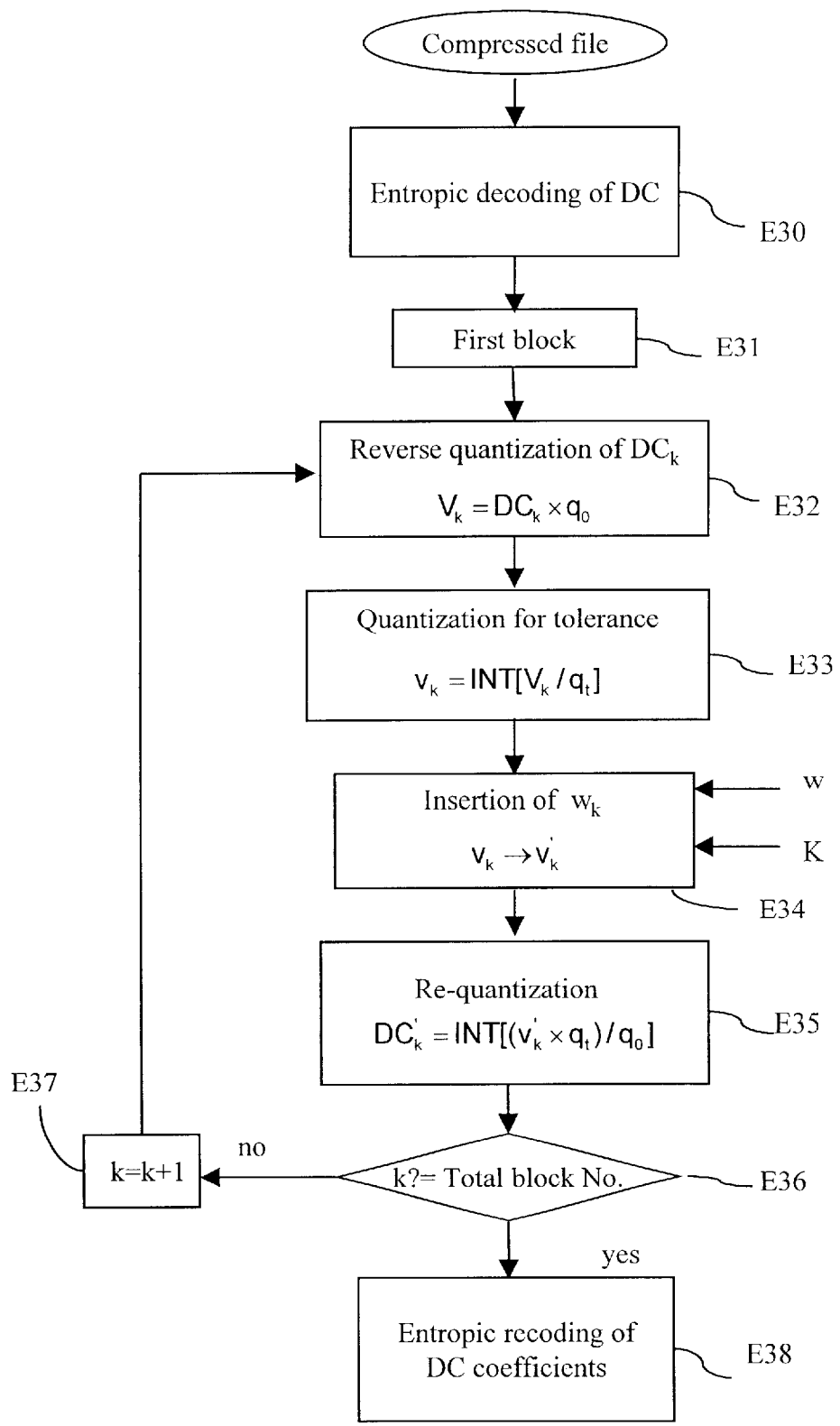
FIG. 17 is an algorithm of the insertion method according to a fourth embodiment of the invention.

FIG. 17 shows the fourth embodiment of the insertion method implemented in the device of FIG. 15 and which comprises steps E30 to E38.

Figure 6:
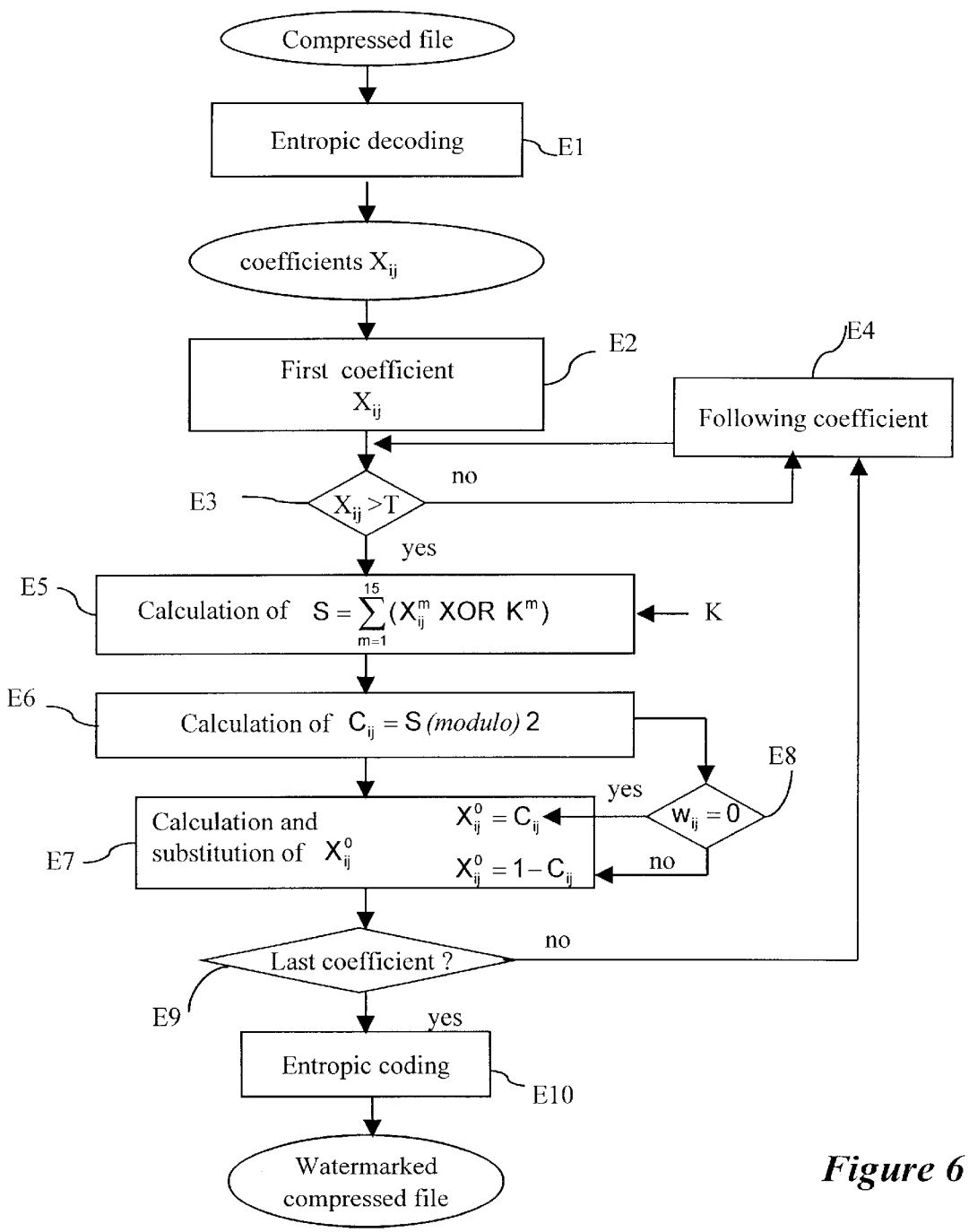
FIG. 6 is an algorithm of the insertion method according to a first embodiment of the invention.

As in FIG. 6, the digital signal is considered, in this example, to be an image I stored in a compressed file. This image I has been compressed using a compression algorithm based on the JPEG standard as currently implemented in various image processing apparatus, notably in a digital photographic apparatus. The image is thus decomposed in a spectral domain by a discrete cosine transformation (DCT), and then quantized, for example by a scalar quantization technique. The set of quantized spectral coefficients is then coded by an entropic coding.

Step E30 comprises entropic decoding of the low-frequency coefficients, or so-called DC coefficients. The other coefficients, i.e. the high-frequency coefficients, or AC coefficients, are not affected in this embodiment.

The following step, E31, is an initialisation for considering a first low-frequency coefficient $DC_k$ corresponding to a first block in the image.

The following step, E32, is a dequantization of current coefficient $DC_k$. For this purpose, use is made of quantization pitch $q_o$ which had been used at the time of compression of the image. Quantization pitch $q_o$ is read in a header of the compression format in which it had been stored. A value $V_k = DC_k \times q_o$ is obtained that is an approximation of the mean value of the block in question.

The following step, E33, comprises quantization of previously calculated value $V_k$, with a quantization pitch $q_t$. Quantization pitch $q_t$ corresponds to the tolerance wished in relation to a possible over-compression of the image. Quantization pitch $q_t$ is typically greater than quantization pitch $q_o$. For example, pitch $q_o$ has a value of eight and pitch $q_t$ has a value of ten. In order to preserve the visual quality of the watermarked image, pitch $q_t$ must remain less than a limit value, typically equal to 16 in the case of JPEG compression.

Here, one obtains a quantized coefficient $v_k = INT[V_k/q_t]$, where INT denotes the integral part.

A watermark to be inserted W formed of coefficients $w_k$ at most equal in number to the number of low-frequency coefficients $DC_k$ is considered.

The following step, E34, comprises the insertion of coefficient $w_k$ of watermark W, in quantized coefficient $V_k$. Insertion is carried out as described in steps E5 to E8 in FIG. 6, applied here to quantized coefficient $V_k$. A watermarked coefficient $v'_k$ is obtained.

It should be noted that, here too, use is made of a confidential key K.

The following step, E35, is a dequantization of watermarked coefficient $v'_k$ considering the quantization pitch $q_t$ specific to insertion, followed by a quantization of the result obtained with quantization pitch $q_o$, to find the initial dynamics of the data.

A coefficient $DC'_k$ is thus obtained that is calculated with the formula $DC'_k = INT[(v'_k \times q_t)/q_o]$.

The following step is a test to determine whether all the low-frequency coefficients $DC_k$ have been processed. If the answer is negative, this step is followed by step E37 to consider a following low-frequency coefficient. Step E37 is followed by step E32, described above.

If the answer is affirmative in step E36, this step is followed by step E38, in which the low-frequency coefficients processed are re-coded entropically and reinserted in the bit stream containing the data of the image.

It should be noted that step E34 can be modified, for example by replacing the least significant bit of the quantized coefficient with information bit $w_k$.

Figure 18:
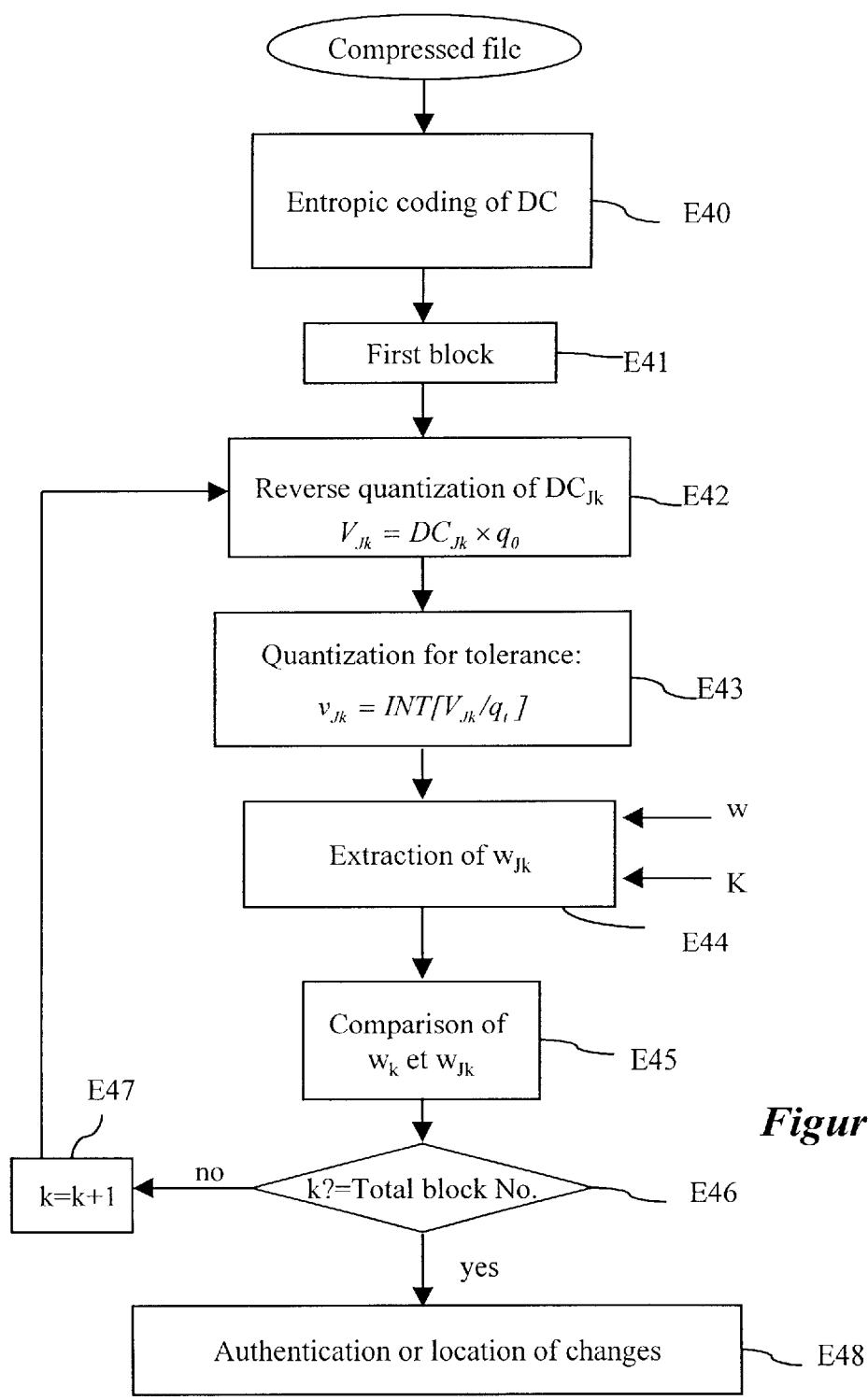
FIG. 18 is an algorithm of the authentication method according to the fourth embodiment.

With reference to FIG. 18, the authentication method associated with the insertion method in this embodiment comprises steps E40 to E48.

Step E40 comprises entropic decoding of the coded low-frequency coefficients of image J. This step is identical with step E30, described above.

The following step, E41, is an initialisation to consider a first low-frequency coefficient $DC_{Jk}$ of image J. The low-frequency coefficients are considered in a predetermined order, a priori any order. The number of low-frequency coefficients is at least equal to the number of coefficients of the watermark searched for.

The following step, E42, comprises dequantization of the current low-frequency coefficient. This step is identical with step E32, described above. It results in a coefficient $V_{jk}$.

The following step, E43, comprises requantization of current low-frequency coefficient $V_{Jk}$ with quantization pitch $q_t$. It results in a quantized coefficient $v_{Jk}$.

The following step, E44, is the extraction of a coefficient $w_{Jk}$ of the inserted watermark. This step is identical with steps E13 to E17 described with reference to FIG. 7 and applied here to quantified coefficient $v_{Jk}$.

The following step, E45, is a comparison of extracted coefficient $w_{Jk}$ with coefficient $w_k$, that is to say the coefficient of the additional information item the insertion of which it is wished to check. The result of the comparison is stored.

The following step, E46, is a test to determine whether all the low-frequency coefficients have been processed. If the answer is negative, this step is followed by step E47 to consider a following low-frequency coefficient. Step E47 is followed by step E42, described above.

When the answer is affirmative in step E46, this step is followed by step E48, at which either the image is authenticated or changes that have occurred in the image are located, as a function of the result of the comparison step for all of the watermarking coefficients.

A description will now be given of a fifth embodiment of the invention with reference to FIGS. 19 and 20.

In this embodiment, it is considered that original image I is represented in its spatial domain, in raw data, by a set of pixels the value of which varies over 256 grey levels, for example.

Image I comprises a set of pixels {X} coded, for example, in 8 bits.

A confidential key K, also represented in 8 bits, is used.

In this example, use is made of a watermark for insertion W comprising a set of KB information bits $w_k$, where KB is an integer and k a subscript varying between 1 and KB.

As described below, each information bit $w_k$ of the watermark will be modulated in original image I and can therefore be extracted for authentication of image J at the input of a decoder.

Figure 19:
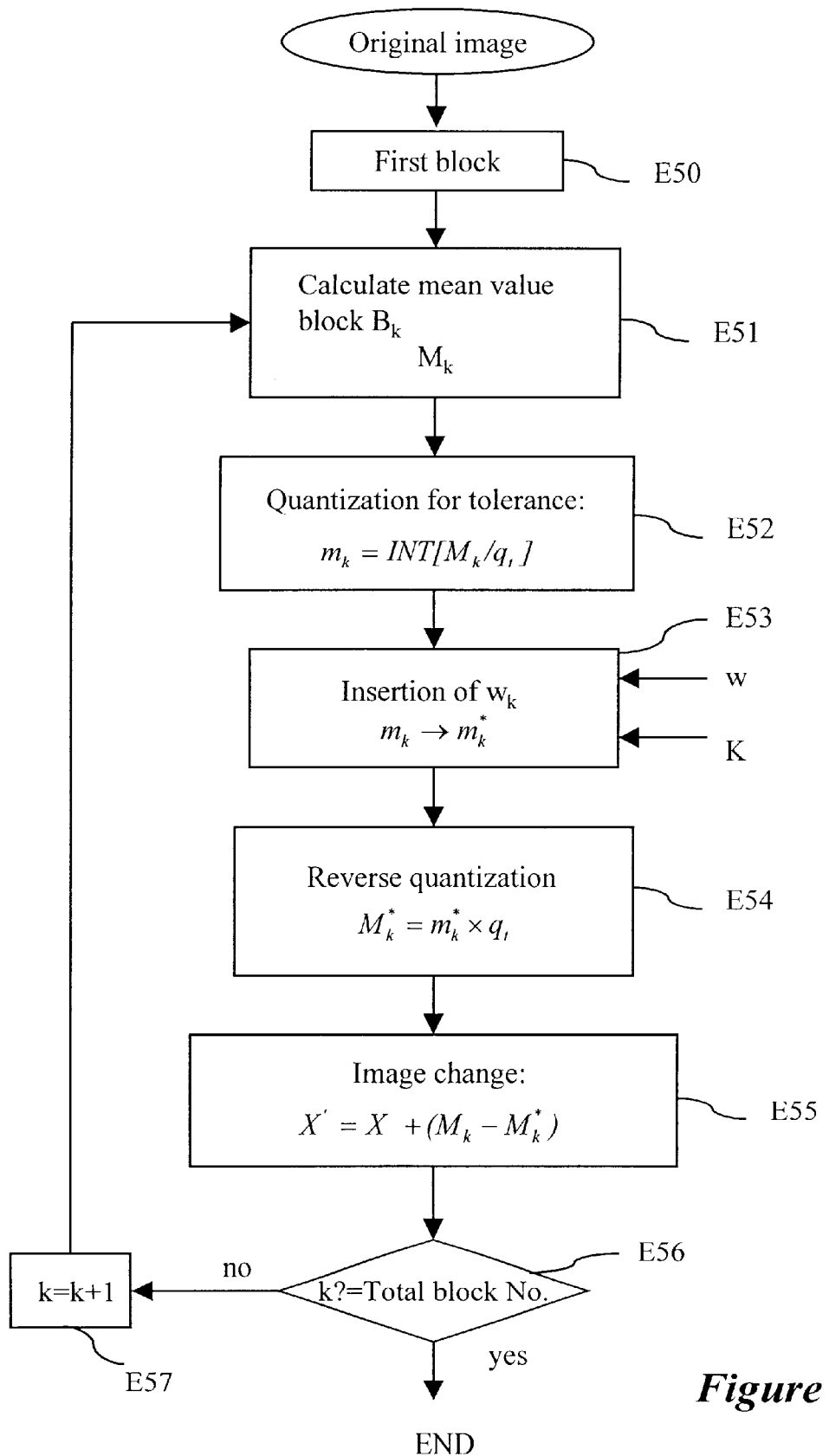
FIG. 19 is an algorithm of the insertion method according to a fifth embodiment of the invention.

The insertion method comprises steps E50 to E57 shown in FIG. 19.

Step E50 comprises an initialisation for considering the first information bit to be inserted. For each of the information bits, a corresponding block is considered in image I. For this purpose, the image is divided into adjacent blocks, the number of which is at least equal to the number KB of bits to be inserted. It is also possible to fix a block size and then to deduce the number of blocks therefrom in order to determine, finally, the size KB of the watermark.

Thus, in following step E51, a parameter representing a block $B_k$ is determined. In this example, the representative parameter is the mean value $M_k$ of the coefficients of block in question.

The following step, E52, is quantization of the previously calculated mean value. For this purpose, as in the previous embodiments, the quantization pitch $q_t$ is considered. Mean value $M_k$ is replaced by its quantized value $m_k$, calculated according to the formula: $m_k = INT[M_k/q_t]$.

The following step, E53, is the insertion, properly speaking, of information bit $w_k$ in quantized coefficient $m_k$. This insertion is carried out, as described in FIG. 13, and, more especially, in steps E5 to E8 applied to quantized coefficient $m_k$. The result of this step is a watermarked coefficient $m^*_k$.

The following step, E54, is a dequantization of the coefficient calculated previously, to form a dequantized watermarked coefficient $M^*_k$, calculated according to the formula $M^*_k = m^*_k \times q_t$.

In the following step, E55, the difference between the mean value calculated in step E51 and the watermarked mean value calculated in step E54 is distributed over all of the coefficients of the block $B_k$ in question. For this purpose, each coefficient, or pixel, X of the block $B_k$ in question is replaced by the coefficient X' calculated according to the formula:

$X' = X + (M_k - M^*_k)$.

The following step, E56, is a test to determine whether all the blocks in the image have been considered. If the answer is negative, this step is followed by step E57 to consider a following block and, consequently, a following information bit for insertion. Step E57 is followed by step E51, described above.

When the answer is affirmative in step E56, insertion of the watermark in the image is complete. In this way, a watermarked image I' is obtained which makes it possible to protect the original image I in its initial spatial representation.

Figure 20:
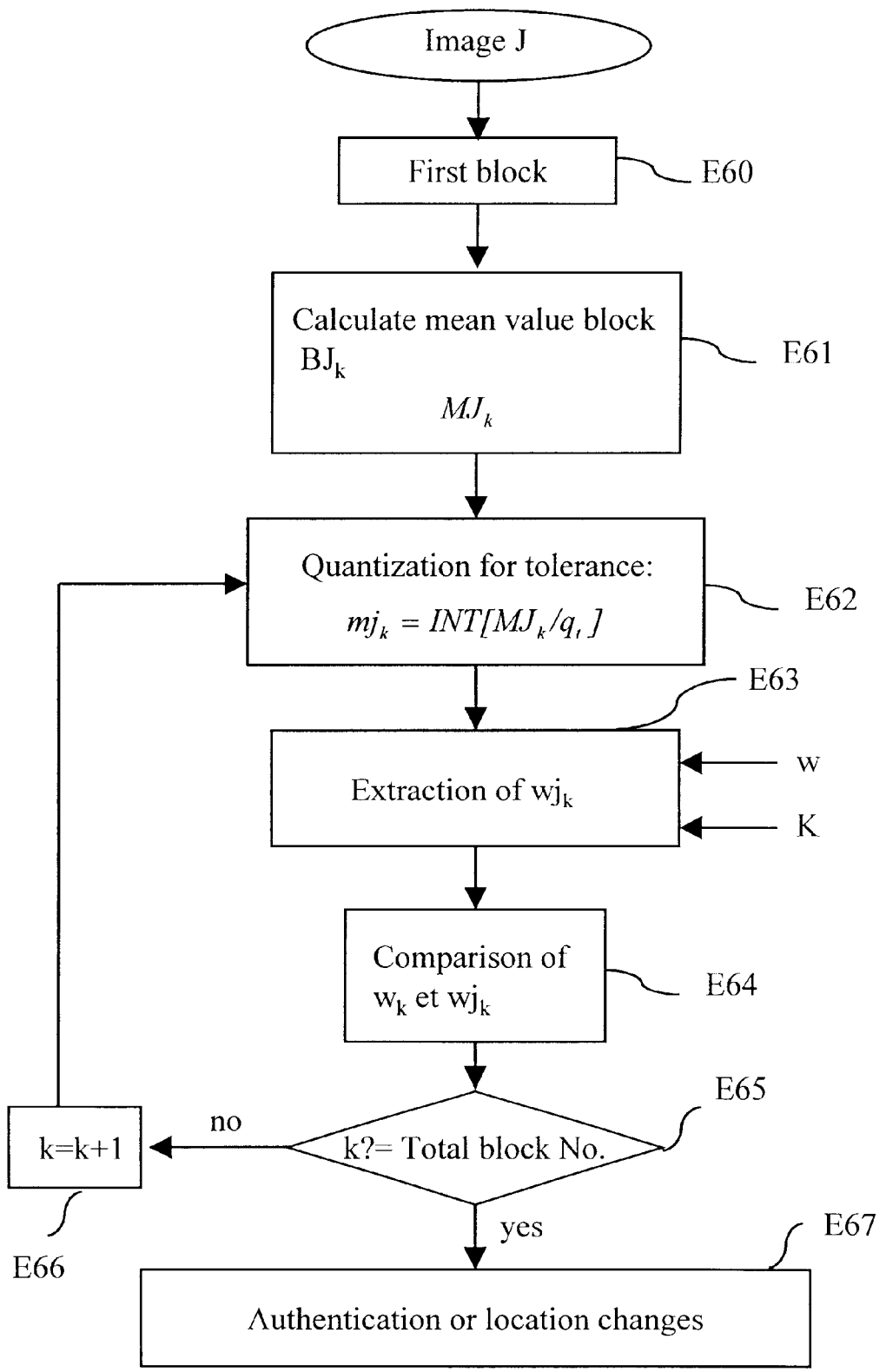
FIG. 20 is an algorithm of the authentication method according to the fifth embodiment.

FIG. 20 represents the authentication method corresponding to the insertion method of FIG. 19. This method comprises steps E60 to E67.

Step E60 is an initialisation for considering a first block in image J to be authenticated. Image J has the same format as image I.

In the following step, E61, the parameter representing a current block $BJ_k$ is calculated. Blocks $BJ_k$ are analogous to blocks $B_k$ in image I they are of the same size and number. As in the insertion method, the representative parameter is the mean value $MJ_k$ of the coefficients of the current block.

The following step, E62, is quantization of current mean value $MJ_k$ with quantization pitch $q_t$, to form a quantized coefficient $mj_k$, obtained with the formula: $mj_k = INT[MJ_k / q_t]$.

The following step, E63, is the extraction of an information bit $wj_k$ from quantized coefficient $mj_k$. Extraction is identical with steps E15 to E17 of FIG. 14, applied to coefficient $mj_k$.

The following step, E64, comprises comparison of information bit $wj_k$ extracted in the preceding step with information bit $w_k$ of watermark W. The result of the comparison is stored.

The following step, E65, is a test to check whether all the blocks in image J have been processed. If the answer is negative, this step is followed by step E66 to consider a following block. Step E66 is followed by step E62, described above.

When the answer is affirmative in step E65, then all the blocks in the image have been processed. Step E65 is then followed by step E67, in which the image is authenticated or the changes are located according to the results of the comparison. It should be noted that, in this embodiment, the changes are located in blocks, and not in coefficients, as in FIG. 14.

It is possible to combine this embodiment with that of FIGS. 13 and 14, that is to say to carry out an insertion in the blocks of coefficients of the image, and then in the coefficients of the image.

The invention applies in particular to digital photographic appliances which store digital images in a compressed file.

Naturally, numerous modifications could be made to the examples described above without departing from the scope of the invention.

Thus the insertion of the watermark can also be implemented on spectral coefficients obtained by a multiresolution spectral decomposition of the digital signal, such as an image, for example by a wavelet spectral decomposition.

It is also possible, in order better to conceal the inserted information, to use a more complex calculation rule for calculating the check bit as a function of the confidential key, provided that this calculation rule can be reproduced at the decoder.

I claim:

1. Method of inserting an additional information item (W) for authenticating a digital signal (I) decomposed into a set of coefficients ($X_{ij}$, $I_{ij}$), the said additional information item (W) being represented by a set of binary values ($w_{ij}$), characterised in that it includes the following steps:
   calculating, for at least one coefficient ($X_{ij}$, $I_{ij}$), a check bit ($C_{ij}$);
   substituting a watermarked coefficient as a function of the check bit ($C_{ij}$) and a binary value ($w_{ij}$) of the additional information item (W) for the said at least one coefficient ($X_{ij}$, $I_{ij}$).

2. Method of inserting an additional information item (W) for authenticating a digital signal (I) decomposed into a set of coefficients ($X_{ij}$, $I_{ij}$), each coefficient being represented in L bits, and said additional information item (W) being represented by a set of binary values ($W_{ij}$) of the same size as said set of coefficients ($X_{ij}$, $I_{ij}$), characterised in that it includes the following steps:
   calculating, for at least one coefficient ($X_{ij}$, $I_{ij}$), a check bit ($C_{ij}$) in accordance with a predetermined operation as a function of L minus M(L−M) first bit planes of said coefficient ($X_{ij}$, $I_{ij}$), wherein said M is the number of bit planes to be substituted;
   calculating M last bit planes ($X^0_{ij}$, $X^0_{ij}$, $I^0_{ij}$) according to a predetermined rule which is reversible as a function of the check bit ($C_{ij}$) and a binary value ($w_{ij}$) of the additional information (W); and
   substituting the last M bit planes calculated ($X^0_{ij}$, $X^0_{ij}$, $I^0_{ij}$) for the last M bit planes of said coefficient ($X_{ij}$, $I_{ij}$).

3. Insertion method according to claim 2, characterised in that, at the step of calculating a check bit ($C_{ij}$), said predetermined operation is a function of the first L−M bit planes and a confidential key (K) represented in L bits.

4. Insertion method according to claim 3, characterised in that said predetermined operation consists of effecting a sum (S) of binary operations on the first L−M bit planes of said coefficient ($X_{ij}$, $I_{ij}$) and the first L−M bit planes of said confidential key (K) and calculating the check bit ($C_{ij}$) as a function of the parity of said sum (S).

5. Insertion method according to one of claims 2 to 4, characterised in that the number M of substituted bit planes is equal to 1 or 2.

6. Insertion method according to one of claims 2 to 4, characterised in that, at the step of calculating the last M bit planes, the value of the last bit plane ($X^0_{ij}$ $I^0_{ij}$) is equal to the value of the check bit ($C_{ij}$) or to the alternative value (1−$C_{ij}$) of the check bit depending on the state of the binary value ($w_{ij}$) of the additional information item.

7. Insertion method according to one of claims 2 to 4, characterised in that the number M of substituted bit planes is equal to 2 and in that, at the step of calculating the last M bit planes, the value of the penultimate bit plane ($X_{ij}$) is equal to the alternative value (1−$X^0_{ij}$) of the last bit plane ($X^0_{ij}$).

8. Insertion method according to one of claims 2 to 4, the digital signal (I) being decomposed into a set of quantized spectral coefficients ($X_{ij}$), characterised in that it also includes a prior step (E3) of choosing a subset of quantized spectral coefficients ($X_{ij}$), in which the chosen coefficients ($X_{ij}$) have at least a magnitude strictly greater than zero, the steps of calculating a check bit, of calculating the last M bit planes and of substituting being implemented for each coefficient ($X_{ij}$) of said subset.

9. Insertion method according to claim 8, characterised in that, at the choosing step (E3), the subset of coefficients includes the quantized spectral coefficients ($X_{ij}$) whose magnitude is greater than a threshold value (T).

10. Insertion method according to claim 8, characterised in that the set of binary values ($w_{ij}$) representing the additional information item (W) is generated by the repetition of an initial binary information item with a size smaller than the size of the set of quantized spectral coefficients ($X_{ij}$).

11. Insertion method according to claim 8, for authenticating a digital signal (I) stored in a compressed file, characterised in that it also includes prior step of entropic decoding (E1) adapted to extract the quantized spectral coefficients ($X_{ij}$) and a step of entropic coding (E10) after the said substitution step.

12. Method of authenticating a digital signal (J) from additional information item (W) inserted in said digital signal by the insertion method according to claim 1, said digital signal (J) being decomposed into a set of coefficients ($Y_{ij}$, $J_{ij}$), each coefficient being represented in L bits, characterised in that it includes the following steps:
  calculating, for at least one coefficient ($Y_{ij}$, $J_{ij}$), a check bit ($C_{ij}$) according to said predetermined operation as a function of L minus M(L−M) first bit planes of said coefficient, wherein said M is the number of bit planes to be substituted;
  extracting the value ($w_{ij}$) of the additional information item inserted in accordance with said predetermined rule which is reversible as a function of the check bit ($C_{ij}$) and M last bit planes ($Y^o_{ij}$, $Y^o_{ij}$, $J^o_{ij}$);
  comparing the extracted value ($w_{ij}$) of the additional information inserted and the binary value ($w_{ij}$) of the additional information item (W); and
  deciding whether or not to authenticate the digital signal (J) depending on whether or not said extracted value ($w_{ij}$) and said binary value ($w_{ij}$) of the inserted additional information item are identical.

13. Authentication method according to claim 12, characterised in that, at the step of calculating a check bit ($C_{ij}$), said predetermined operation is a function of the first L-M bit planes and a confidential key (K) represented in L bits.

14. Authentication method according to claim 13, characterised in that said predetermined operation consists of effecting a sum (S) of binary operations on the first L-M bit planes of said coefficient ($Y_{ij}$, $J_{ij}$) and the first L-M bit planes of said confidential key (K) and calculating the check bit ($C_{ij}$) as a function of the parity of said sum (S).

15. Authentication method according to one of claims 12 to 14, characterised in that the number M of bit planes at the extraction step is equal to 1 or 2.

16. Authentication method according to one of claims 12 to 14, characterised in that, at the extraction step, the value ($w_{ij}$) of the additional information item is equal to one state or another state depending on whether or not the value of the last bit plane ($Y^o_{ij}$, $J^o_{ij}$) and the value of the check bit ($C_{ij}$) are equal.

17. Authentication method according to one of claims 12 to 14, characterised in that, at the extraction step, the number M of bit planes is equal to 2 and in that the value of the additional information item ($w_{ij}$) is extracted only if the value of the penultimate bit plane ($Y_{ij}$) is equal to the alternative value ($1-Y^o_{ij}$) of the last bit plane ($Y^o_{ij}$).

18. Authentication method according to one of claims 12 to 14, the digital signal (J) being broken down into a set of quantized spectral coefficients ($J_{ij}$), characterised in that it also includes a prior step of choosing a subset of quantized spectral coefficients, in which the chosen coefficients ($J_{ij}$) have a nnagnitude greater than a threshold value (T), the steps of calculating a check bit, of extracting (17), of comparing and of deciding being implemented for each coefficient ($J_{ij}$) of said subset.

19. Authentication method according to claim 18, for authenticating a digital signal stored in a compressed file, characterised in that it also includes a prior step of entropic decoding (E11) adapted to extract the quantized spectral coefficients ($J_{ij}$).

20. Device for inserting an additional information item (W) for authenticating a digital signal (I) decomposed into a set of coefficients ($X_{ij}$, $I_{ij}$), the said additional information item (W) being represented by a set of binary values ($w_{ij}$), characterised in that it includes:
  means of calculating, for at least one coefficient ($X_{ij}$, $I_{ij}$), a check bit ($C_{ij}$);
  means of substituting a coefficient watermarked as a function of the check bit ($C_{ij}$) and a binary value ($w_{ij}$) of the additional information item (W), for the said at least one coefficient ($X_{ij}$, $I_{ij}$).

21. Device for inserting an additional information item (W) for authenticating a digital signal (I) decomposed into a set of coefficients ($X_{ij}$, $I_{ij}$), each coefficient being represented in L bits, and said additional information item (W) being represented by a set of binary values ($w_{ij}$) of the same size as said set of coefficients, characterised in that it has:
  means of calculating (21) a check bit ($C_{ij}$) in accordance with a predetermined operation as a function of L minus M(L−M) first bit planes of a coefficient ($X_{ij}$, $J_{ij}$), wherein said M is the number of bit planes to be substituted;
  means of calculating (22) M last bit planes ($X^o_{ij}$, $X^o_{ij}$, $I^o_{ij}$) according to a predetermined rule which is reversible as a function of the check bit and a binary value of the additional information item; and
  means of substituting (23) the last M bit planes calculated ($X^o_{ij}$, $X^o_{ij}$, $I^o_{ij}$) for the last M bit planes of said coefficient ($X_{ij}$, $I_{ij}$).

22. Insertion device according to claim 21, characterised in that said predetermined operation of the calculation means (21) is a function of the first L-M bit planes and of a confidential key (K) represented in L bits.

23. Insertion device according to one of claims 21 or 22, characterised in that the number M of substituted bit planes is equal to 1 or 2.

24. Insertion device according to one of claims 21 or 22, the digital signal (I) being decomposed into a set of quantized spectral coefficients ($X_{ij}$), characterised in that it also has means of choosing (26) a subset of quantized spectral coefficients adapted to choose coefficients ($X_{ij}$) having at least a magnitude strictly greater than zero.

25. Insertion device according to claim 24, characterised in that the choosing means (26) are adapted to choose quantized spectral coefficients ($X_{ij}$) whose magnitude is greater than a threshold value (T).

26. Insertion device according to one of claims 21 or 22, for authenticating a digital signal (I) stored in a compressed file, characterised in that it also has entropic decoding means (25) adapted to extract the quantized spectral coefficients and entropic coding means (27).

27. Insertion device according to one of claims 21 or 22, characterised in that it is incorporated in a microprocessor (100), a read only memory (102) comprising a program for inserting an additional information item (W) in a digital signal (I) and a random access memory (103) containing registers adapted to record variables modified during the running of the program.

28. Device for authenticating a digital signal (J) from an additional information item (W) inserted in said digital signal by the insertion method according to claim 2, said digital signal (J) being decomposed into a set of coefficients ($Y_{ij}$, $J_{ij}$), each coefficient being represented in L bits, characterised in that it has:

means of calculating (31) a check bit ($C_{ij}$) according to said predetermined operation as a function of L minus M(L−M) first bit planes of a coefficient ($Y_{ij}$, $J_{ij}$), wherein said M is the number of bit planes to be substituted;

means of extracting (32) the value ($w_{ij}$) of the additional information item inserted in accordance with said predetermined rule which is reversible as a function of the check bit ($C_{ij}$) and the last M bit planes ($Y^0_{ij}$, $Y^0_{ij}$, $J^0_{ij}$) of said coefficient;

means of comparing (33) the extracted value ($w_{ij}$) of the additional information item inserted and the binary value ($w_{ij}$) of the additional information item; and means of deciding (34) whether or not to authenticate the digital signal depending on whether or not said extracted value ($w_{ij}$) and said binary value ($w_{ij}$) of the inserted additional information item (W) are identical.

29. Authentication device according to claim 28, characterised in that said predetermined operation of the calculation means (31) is a function of the first L-M bit planes and of a confidential key (K) represented in L bits.

30. Authentication device according to one of claims 28 or 29, characterised in that the number M of bit planes used by the extraction, means (32) is equal to 1 or 2.

31. Authentication device according to one of claims 28 or 29, the digital signal (J) being decomposed into a set of quantized spectral coefficients ($Y_{ij}$), characterised in that it also has means of choosing (36) a subset of quantized spectral coefficients ($Y_{ij}$) adapted to choose coefficients ($Y_{ij}$) having a magnitude greater than a threshold value (T).

32. Authentication device according to claim 31, for authenticating a digital signal (J) stored in a compressed file, characterised in that it also has entropic decoding means (35) adapted to extract quantized spectral coefficients ($Y_{ij}$).

33. Authentication device according to one of claims 28 or 29, characterised in that it is incorporated in a microprocessor (100), a read only memory (102) containing a program for authenticating a digital signal (J) and a random access memory (103) containing registers adapted to record variables modified during the running of the program.

34. Computer characterised in that it has means adapted to implement the insertion method according to one of claims 1 to 4.

35. Computer, characterised in that it has means adage to implement the authentication method according to one of claims 12, 13 or 14.

36. Computer characterised in that it comprises an insertion device according to one of claims 20, 21 or 22.

37. Computer, characterised in that it comprises an authentication device according to one of claims 28 or 29.

38. Digital signal processing apparatus, characterised in that it has means adapted to implement the insertion method according to one of claims 1 to 4.

39. Digital signal processing apparatus, characterised in that it has means ted to implement the authentication method according to one of claims 12, 13 or 14.

40. Digital signal processing apparatus, characterised in that it comprises an insertion device according to one of claims 20, 21 or 22.

41. Digital signal processing apparatus, characterised in that it comprises an authentication device according to one of claims 28 or 29.

42. Digital photographic apparatus, characterised in that it has means adapted to implement the insertion method according to one of claims 1 to 4.

43. Digital photographic apparatus, characterised in that it has means adapted to implement the authentication method according to one of claims 12, 13 or 14.

44. Digital photographic apparatus, characterised in that it comprises an insertion device according to one of claims 20, 21, or 22.

45. Digital photographic apparatus, characterised in that it comprises an authentication device according to one of claims 28 or 29.

46. Digital camera, characterised in that it has means adapted to implement the insertion method according to one of claims 1 to 4.

47. Digital camera, characterised in that it has means adapted to implement the authentication method according to one of claims 12, 13 or 14.

48. Digital camera, characterised in that it comprises an insertion device according to one of claims 20, 21, or 22.

49. Digital camera, characterised in that it comprises an authentication device according to one of claims 28 or 29.

* * * * *

UNITED STATES PATENT AND TRADEMARK OFFICE
CERTIFICATE OF CORRECTION

PATENT NO. : 6,633,652 B1
DATED : October 14, 2003
INVENTOR(S) : Donescu

It is certified that error appears in the above-identified patent and that said Letters Patent is hereby corrected as shown below:

Drawings,
Figure 7, "non" should read -- no --.

Column 5,
Line 58, "values" should read -- values; --.

Column 7,
Line 67, "embodiment." should read -- embodiment; --.

Column 11,
Line 55, "$X_{ij}$" should read -- $X_{ij}$, --.

Column 12,
Line 11, "to" should read -- to be --; and
Line 26, "independently" should read -- independent --.

Column 14,
Line 38, "w'$_{ij}$=c$_{ij}$XOR Y°$_{ij}$" should read -- w'$_{ij}$=C$_{ij}$ XOR Y°$_{ij}$ --.

Column 16,
Line 39, "pixels $_{ij}$" should read -- pixels $I_{ij}$ --.

Column 17,
Line 14, "1-$C_{ij}$" should read -- 1-$C_{ij}$. --.

Column 18,
Line 7, "image" should read -- image; --; and
Line 34, "includes" should read -- includes; --.

Column 19,
Line 35, "[(v'$_{kxqt}$)/q$_o$]." should read -- [(v'$_{kx}$q$_t$)/q$_o$]. --.

Column 20,
Line 44, "of block" should read -- of the block --.

Column 21,
Line 20, "image I" should read -- image I; --.

UNITED STATES PATENT AND TRADEMARK OFFICE
CERTIFICATE OF CORRECTION

PATENT NO. : 6,633,652 B1
DATED : October 14, 2003
INVENTOR(S) : Donescu

It is certified that error appears in the above-identified patent and that said Letters Patent is hereby corrected as shown below:

Column 22,
Line 5, "$(C_{ij})$;" should read -- $(C_{ij})$; and --;
Line 21, "$(X_{ij}^{o},$" should read -- $(X^{o}_{ij},$ --; and
Line 43, "$(X^{o}_{ij}I^{o}_{ij})$" should read -- $(X^{o}_{ij}, I^{o}_{ij})$ --.

Column 24,
Line 9, "$(C_{ij})$;" should read -- $(C_{ij})$; and --;
Line 22 "$(X_{ij, ij})$," should read -- $(X_{ij}, I_{ij})$, --.

Column 26,
Line 1, "adage" should read -- adapted --; and
Line 12, "ted" should read -- adapted --.

Signed and Sealed this

Twentieth Day of July, 2004

JON W. DUDAS
*Acting Director of the United States Patent and Trademark Office*